(12) United States Patent
Nguyen

(10) Patent No.: US 11,610,413 B1
(45) Date of Patent: Mar. 21, 2023

(54) DRIVER IDENTIFICATION USING UPDATING CLUSTER ANALYSIS

(71) Applicant: Lytx, Inc., San Diego, CA (US)

(72) Inventor: Vincent Nguyen, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 114 days.

(21) Appl. No.: 17/203,475

(22) Filed: Mar. 16, 2021

(51) Int. Cl.
*G06V 20/59* (2022.01)
*G06K 9/62* (2022.01)
(Continued)

(52) U.S. Cl.
CPC .............. *G06V 20/59* (2022.01); *G06F 16/58* (2019.01); *G06K 9/6218* (2013.01); *G06V 40/168* (2022.01); *G06V 40/172* (2022.01)

(58) Field of Classification Search
CPC .... G06V 20/59; G06V 40/168; G06V 40/172; G06V 20/54; G06V 20/625; G06V 20/597; G06V 20/194; G06V 10/95; G06V 20/10; G06V 20/56; G06V 20/58; G06V 20/582; G06V 20/588; G06V 2201/10; G06V 30/194; G06V 40/19; G06F 16/58; G06F 3/14; G06F 3/147; G06F 16/252; G06F 16/29; G06F 3/04842; G06F 3/04845; G06F 16/243; G06F 16/9535; G06F 16/9038; G06F 3/0482; G06F 16/53; G06F 16/532; G06F 16/00; G06F 21/36; G06F 8/65; G06F 16/24578; G06F 16/248; G06F 16/3344; G06K 9/6218; G07C 5/0816; G07C 5/008; G07C 5/0808; G07C 5/085; G07C 5/00; G07C 5/0858; G07C 5/12; G07C 5/0866; G07C 9/00571; G07C 5/02; G07C 5/0891; G07C 5/08; G07C 9/22; G06Q 30/0269; G06Q 10/06393; G06Q 30/0267; G06Q 30/0266; G06Q 10/047; G06Q 10/109; G06Q 50/30; G06Q 10/04; G06T 17/05; G06T 19/00; G06T 19/003; G06T 13/20; G08G 1/202; G08G 1/0129; G08G 1/0112; G08G 1/0141; G08G 1/166; G08G 1/0133; G08G 1/012; G08G 1/20; G08G 1/123;
(Continued)

(56) References Cited

U.S. PATENT DOCUMENTS 10,956,855 B1 * 3/2021 Coughran .............. G06N 20/00
2015/0379331 A1 * 12/2015 Nemat-Nasser ...... G06T 1/0007
382/118
(Continued)

*Primary Examiner* — Nimesh Patel
(74) *Attorney, Agent, or Firm* — Van Pelt, Yi & James LLP

(57) ABSTRACT

A system for driver identification includes an interface and a processor. The interface is configured to receive a trip; and receive a set of albums, wherein an album of the set of albums includes one or more existing trips. The processor is configured to determine similarities for the trip to all trips in the set of albums; determine a first clustering based at least in part on the similarities; indicate that the trip is a provisionally assigned trip that is provisionally assigned to the album of the set of albums based at least in part on the first clustering; determine a second clustering for a set of provisionally assigned trips and all trips in the set of albums, wherein the set of provisionally assigned trips comprises qualified provisionally assigned trips; and determine updated trip assignments for an updated set of albums.

20 Claims, 11 Drawing Sheets

(51) Int. Cl.
*G06F 16/58* (2019.01)
*G06V 40/16* (2022.01)

(58) Field of Classification Search
CPC ....... G08G 1/096822; G08G 1/096816; G08G 1/096775; G08G 1/096; G08G 1/017; G08G 1/143; G08G 1/0969
See application file for complete search history.

(56) References Cited

U.S. PATENT DOCUMENTS

| | | | |
|---|---|---|---|
| 2016/0202074 A1* | 7/2016 | Woodard | G06Q 10/047 701/465 |
| 2017/0364821 A1* | 12/2017 | Mathur | G01C 21/26 |
| 2020/0004842 A1* | 1/2020 | Fateem | G06F 16/29 |
| 2020/0172112 A1* | 6/2020 | Kawashima | B60W 50/08 |

* cited by examiner

US 11,610,413 B1

DRIVER IDENTIFICATION USING UPDATING CLUSTER ANALYSIS

BACKGROUND OF THE INVENTION

Modern transportation vehicles (e.g., airplanes, boats, trains, cars, trucks, etc.) often include a vehicle event recorder to support fleet safety, efficiency, and operational compliance. A vehicle event recorder typically includes a set of sensors—for example, video recorders, accelerometers, global positioning system (GPS) sensors, etc.—that report data for storage. This data is ideally stored along with metadata including a driver identity. However, this creates a problem as frequently the driver identity is not known to the vehicle event recorder.

BRIEF DESCRIPTION OF THE DRAWINGS

Various embodiments of the invention are disclosed in the following detailed description and the accompanying drawings.

DETAILED DESCRIPTION

Figure 1:
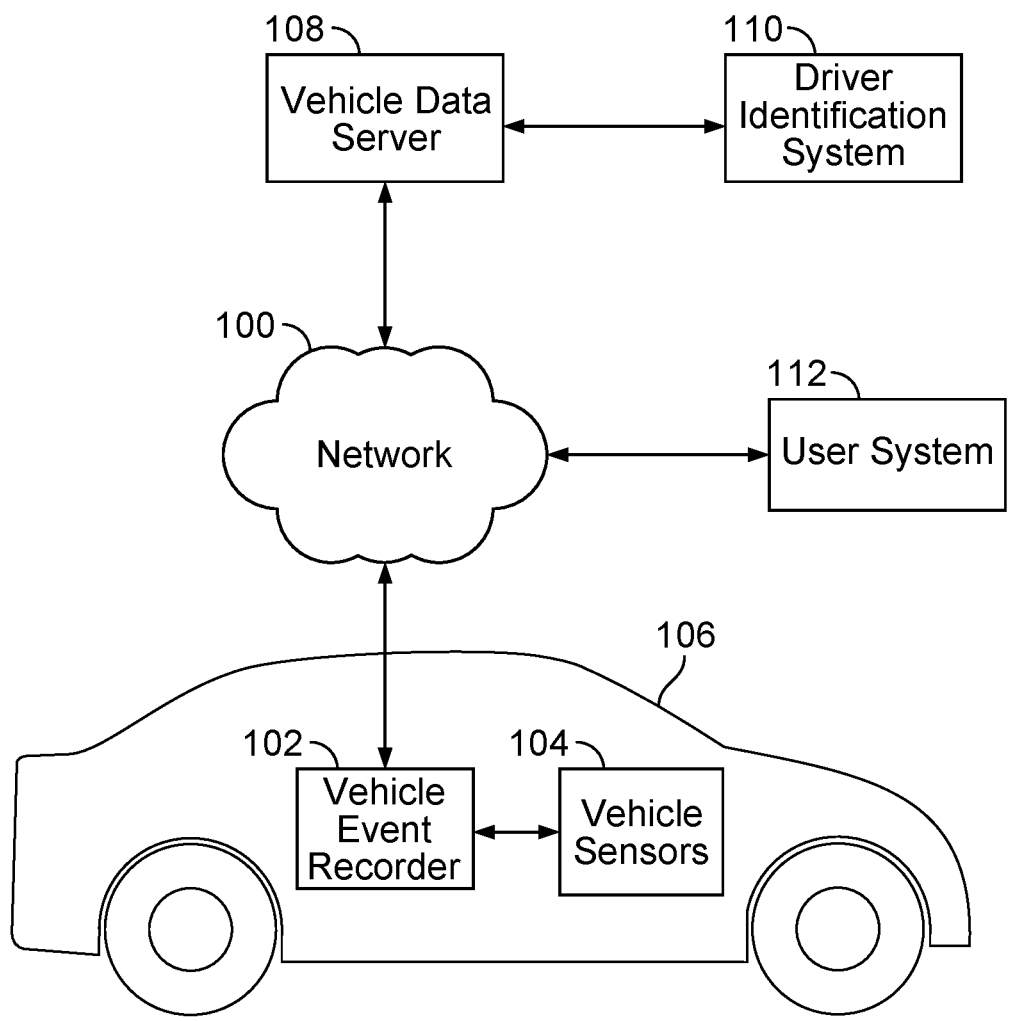
FIG. 1 is a block diagram illustrating an embodiment of a system including a vehicle event recorder and driver identification system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for driver identification is disclosed. The system comprises an interface and a processor. The interface is configured to receive a trip and a set of albums. An album of the set of albums includes one or more existing trips. The processor is configured to determine similarities for the trip to all trips in the set of albums; determine a first clustering based at least in part on the similarities; indicate that the trip is a provisionally assigned trip that is provisionally assigned to the album based at least in part on the first clustering; determine a second clustering for a set of provisionally assigned trips and all trips in the set of albums, wherein the set of provisionally assigned trips comprises qualified provisionally assigned trips; and determine updated trip assignments for an updated set of albums.

In some embodiments, the system further comprises a memory that is coupled to the processor and configured to provide the processor with instructions. In some embodiments, the system further comprises an interface that is coupled to the processor and is configured to receive input for the processor or provide output from the processor.

Modern transportation vehicles (e.g., airplanes, boats, trains, cars, trucks, etc.) often include a vehicle event recorder to support fleet safety, efficiency, and operational compliance. A vehicle event recorder typically includes a set of sensors—for example, video recorders, accelerometers, global positioning system (GPS) sensors, etc.—that report data that can be analyzed to identify a driver and track driver status. Over the course of a long trip (e.g., interstate travel), numerous driver images are obtained (e.g., every 10 minutes) along with associated GPS location and time information. Analyzing, cataloging (e.g., into albums), and indexing a fleet of drivers and associated trip data creates a problem as how to automatically and cost-effectively analyze and provide ready and reliable driver identification and status (e.g., to a fleet management organization).

A vehicle event recorder is able to record sensor data both internal and external to a vehicle. For an employer employing drivers (e.g., a business that runs a fleet of delivery or service vehicles), it is desirable to understand both internal and external events during the operation of a vehicle in their fleet. The sensor data can also be used to determine a driver's identity (ID) and status while operating the vehicle.

Typically, image data from a vehicle sensor is captured by the event recorder and is annotated with labels that identify, describe, classify, and/or otherwise characterize the images obtained from the vehicle sensor (e.g., a digital still camera, a digital video camera, etc.). These labels can then be provided to the employer directly or analyzed (e.g., driver ID, status, statistics generated, flags or warnings generated, etc.) and the analysis results provided to the employer.

With hundreds of thousands of vehicle event recorders and hundreds of images per vehicle, the amount of image data that needs labeling numbers in the tens of millions of instances. In addition, each image may be associated with a plurality of metadata labels leading to a large data set. This large amount of data is intractable to analyze and manage by human analysis and management efforts alone.

One solution to making the overall system more efficient and cost-effective is to reduce the size of the data set by converting pixel-based digital images into a vector format that represents the driver. However, each image vector representation of a driver (i.e., each facial feature embedding) may suffer from reduced quality due either to the vector conversion process and/or due to poor image quality of the native image data. This reduced quality in turn can degrade the accuracy of characterizing and identifying the driver. Additionally, an image vector representation is typically not as accurate as reviewing by human review, since each image vector representation is independent of one another and the resultant characterization process of a driver's ID over the course of one or more trips tends to be noisy. The disclosed driver identification system addresses these shortcomings.

In some embodiments, the disclosed system comprises one or more vehicle event recorders, a communication network, a vehicle data server, and a driver identification system comprising one or more processors, one or more deep learning models, and a database. In some embodiments, the vehicle data server is incorporated into the driver identification system.

In some embodiments, the disclosed driver identification process comprises collecting driver images and related metadata, constructing facial feature embeddings (i.e., 'face embeddings' or 'faces'), combining faces into trips, constructing albums (i.e., a collection of self-similar trips that represent a driver), assigning new trips to albums, naming the albums, and updating the albums. Deep learning models are used to generate the vector-based face embeddings. A vector similarity metric is used to measure the similarity between two faces. Cluster analysis is used to group faces in such a way that faces in the same group (called a cluster) are more similar to each other than to faces in other clusters.

For example, an image of the driver is captured in the event that it has been some minimum time (e.g., at least 10 minutes) since the last captured image, and the vehicle is moving above some minimum speed threshold (e.g., 5 mph). Each driver image is labeled with metadata (e.g., information about when and where the image was taken, information about the driver and/or vehicle at the time the image was acquired, etc.). Driver images and metadata are uploaded, and no further processing is done on the event recorder. For example, driver images and metadata are uploaded via a mobile communication network to a server (e.g., a vehicle data server). In some embodiments, the vehicle data server stores, processes, and secures the uploaded driver images and metadata. In some embodiments, the vehicle data server serves the uploaded driver images and metadata to the driver identification system.

One or more processors of the driver identification system converts the driver images to a list of numbers (e.g., a vector) referred to as facial features. In modern deep learning approaches, these features are called embeddings. These facial feature embeddings (i.e., 'face embeddings' or 'faces') contain information about the driver that is used to distinguish between images (e.g., whether two different images are the same person). For example, the driver image is converted to a face embedding using the one or more deep learning models of the driver identification system.

In some embodiments, once all the faces from a given vehicle and driving session are processed (e.g., by the one or more processors of the driver identification system), they are combined into trips. Faces connected by periods of long non-stop driving are assigned a unique trip identifier (ID) and are assumed to be one driver. Faces from two contiguous trip IDs are compared against each other to determine whether two trip IDs should be combined into one trip ID. This procedure is repeated until a complete list of trips is generated for a given driving session.

Each trip is represented by a trip embedding, which combines face embeddings of that trip into a representative face embedding. In some embodiments, the representative face embedding comprises an average of a set of face embeddings from the trip. In some embodiments, the set of face embeddings comprises face embeddings with a similarity rank to one or more average images above a threshold. In some embodiments, the one or more average images comprise one or more of the following: an average face-location image, an average face-pose image, and an average torso-location image.

In some embodiments, a trip comprises a trip embedding, a start and end time, a start and end location, and vehicle information. In various embodiments, a trip comprises one or more of: a trip embedding, a start time, an end time, a start location, an end location, a quality designation, a vehicle identifier, and any other appropriate trip information. In some embodiments, the quality designation can be a high-quality (HQ) or low-quality (LQ) designation—for example, as determined by a rank-ordering process based on similarity (e.g., cosine similarity, Euclidean distance, Jensen-Shannon divergence, structural entropic distance, or any other appropriate measure of similarity). HQ trips have enough faces that an average embedding well represents the driver, while LQ trips have fewer self-similar faces where outliers may skew the average embedding adversely.

In some embodiments, a given trip, at any particular time will belong to one of five assignment buckets—hard buffered assignment, soft buffered assignment, hard final assignment, soft final assignment, and vehicle standby. Hard/Soft indicates the level of confidence that a trip is associated with an album in the network. Hard assignments are very confident and no alternate suggested drivers/albums are possible. Soft assignments are less confident and can provide a top-N match to existing albums (e.g., the trip is 60% driver 1, 30% driver 4, 10% driver 2). Buffer/Final indicates if the trip assignment may change in the future. Buffered trips are a temporary assignment to the current network (i.e., entire collection of albums for a group). As future trips are created and evaluated, more context is available to make a better assignment if possible to the buffered trips (e.g., a new driver does not have an album yet, drastic changes to appearance for an in-network driver). Final assignments are static; they represent the best possible assignment after allowing future context to change the assignment. A trip will be assigned to vehicle standby when the vehicle has not accumulated the minimum required number of HQ trips to participate. As the vehicle accumulates more trips, the standby trips will eventually be reassigned among the four other assignment buckets.

In some embodiments, any time the system compares two trips, a graph convolutional network (GCN) is used to provide the pairwise similarity. In general, comparing two images/trips is easier if there is context provided by other similar images/trips from the group. The GCN is a natural way to have a model learn this idea. The inputs to the GCN are a graph structure and some node-level features (e.g., node embeddings). In some embodiments, it is typical to evaluate N trips all together. For each trip in the collection of N, the GCN will evaluate similarity to other trips close by in the embedding space. To construct the graph input, first find n nearest trips to the evaluation trip. Then, for each of those n trips, find m nearest trips. This procedure uses cosine similarity as the metric for searching the embedding space for neighbors. The end result of the neighbor searching procedure is a list of nodes for the input graph. To construct the edges, connect e number of closest neighbors for each node in the graph (e.g., typically e is smaller than n or m). After the graph is defined, the node embeddings are assembled by concatenating the trip embeddings with the trip time and location information. Finally, the GCN takes the graph and node embeddings as inputs and will perform a link prediction between all trips in the graph with the evaluation trip. Aggregate all N GCN outputs to construct the final output of a weighted graph. The output weighted graph consists of the N evaluation nodes, and the edges are weighted by the GCN output scores. In summary, the GCN learns how to compare two trips using the context of other facially similar trips as well as the relative physical distance and time between those context-trips.

In some embodiments, it is useful to apply clustering to the weighted graph GCN output. In various embodiments, the clustering algorithm comprises one or more of the following: approximate rank order clustering, Markov clustering, simple edge pruning, or any other appropriate clustering algorithm. These algorithms are used to create clusters of self-similar trips that are attributed to one or more drivers based on the provided similarity scores. The clustering algorithms also can create single-node clusters meaning the trip does not belong to any other cluster. These singleton trips are soft-assigned.

When a user (e.g., a fleet management organization) starts using the driver identification system for the first time, trips are initially collected for a period of time (e.g., a few days) until sufficient trips are collected to generate candidate albums (i.e., collections of self-similar trips that are thought to represent a given driver). During the system initialization period, a vehicle qualified to participate in generating candidate albums in the event that the number of HQ trips from the vehicle exceeds some minimum threshold (e.g., three, four, five, or any other appropriate number). Otherwise, the vehicle is disqualified and put into the vehicle standby list.

In some embodiments, once sufficient HQ trips are collected, a graph convolutional network (GCN) is used to analyze the trips to produce a weighted graph—for example, a weighted graph comprising nodes and edges is produced, wherein nodes are entities (e.g., trips) and edges represent the connections between nodes (e.g., a similarity rank or score).

In some embodiments, for qualified vehicles, the GCN is run on all HQ trips and cluster analysis performed on the weighted graph. The clusters that are greater than a minimum size (e.g., 3, 4, 5, 6, 7, or any appropriate minimum size) become the very first albums to initialize the system (i.e., the trips in the candidate albums are final hard assigned and become new albums). The remaining qualified vehicle trips that were not 'hard assigned' to an album are placed in the soft assignment buffer, each trip being associated to the new albums (e.g., based on a similarity score that most closely matches a particular album from the set of new albums). At the end of system initialization, a trip will end up in one of the following categories: in vehicle standby, in an album (i.e., final hard assigned), or in a soft assignment buffer.

In some embodiments, once system initialization is complete, the driver identification process is applied to new trips (e.g., trips generated from new images received from a vehicle event recorder) to determine the appropriate assignment bucket. If the trip comes from a disqualified or new vehicle, place the trip in the vehicle standby list; this may trigger a network update (described later), in which case the vehicle standby list will be reallocated to the other assignment buckets or albums. Otherwise, run the GCN to evaluate the single new trip against all trips in the network (i.e., all albums). Next, run clustering on the weighted graph output. If the new trip successfully clusters with an existing album, then place the trip in the hard assignment buffer. If the trip does not cluster with an existing album (the trip may form a singleton cluster), then place the trip in the soft assignment buffer (e.g., see FIG. 3).

The system improves the computer by improving computation accuracy and speed to perform calculations for identifying a driver identity. For example, the use of the clustering in the system's staged design improves identification of a driver and enables an automatic process for driver identification. The driver identity is used for metadata labeling of trip associated data and for subsequent analysis of driver performance and identification of coaching information for driver improvement.

In some embodiments, new trips are processed one at a time. In the event that the new trip is from an unknown vehicle, it is added to a standby list. In the event that the new trip is from a standby vehicle—for example, a known vehicle not yet included in the system's collection of existing albums (i.e., the system 'network')— it is added to the standby list. In the event that the addition of the new trip qualifies the vehicle for system participation (e.g., qualified based on a minimum number of available HQ trips), a system update is performed. In the event that the new trip belongs to an in-network vehicle, the GCN is run on the entire network, including the new trip, to generate an updated weighted graph. Cluster analysis is then performed on the updated weighted graph. In the event that the new trip successfully clustered with an existing album, the new trip is placed into a hard assignment buffer. Otherwise, the new trip is added to a soft assignment buffer. In some embodiments, the hard assignment buffer and soft assignment buffer comprise data storage locations (e.g., within the database of the driver identification system).

In some embodiments, after N days since the last network update (e.g., N=2, 3, 4, 5 or any other appropriate number), trips will have accumulated in both the hard assignment buffer and the soft assignment buffer. Candidate trips are next assembled for possible entry into the network, wherein candidate trips comprise the trips within both the hard and soft buffers but exclude any LQ trips. LQ trips are excluded from consideration for entry into the network, wherein LQ trips comprise trips constructed from a number of driver images below some minimum number (e.g., two, three, four, five, seven, or any other appropriate number) from a set of driver images that has been ranked above some threshold confidence level (e.g., 30%, 38%, 40%, 50%, 57%, 65%, or any other appropriate confidence level).

In some embodiments, the candidate trips are next checked by the GCN to ensure they self-cluster amongst themselves (i.e., GCN and cluster analysis is performed only on the candidate trips and excludes trips within the existing network). Candidate trips that form clusters of some minimum size (e.g., 3, 4, 5, 6, 7, or any appropriate minimum size) move onto the next stage of album candidacy. The candidate trips, this time including trips within the existing network, are then run through the GCN and clustered based on possible association to new or existing albums. All trips that did not make it into a new cluster remain in the buffers.

In some embodiments, finally, each album undergoes cleansing for age and similarity. There is a maximum number of trips M allowed in an album (e.g., M is five, ten, twenty, thirty, thirty-five, forty, sixty-three, or any other appropriate number). In the event that, after determining the set of candidate trips, there will be E number of excess trips above M (inclusive of the candidate trips and the existing trips in the album), a fraction of E of the oldest trips are removed (e.g., ¾, ⅔, ½, ⅓, ¼, or any other appropriate fraction are removed). Next, the trips that closest to the nearest confusing album are removed to bring the total number of trips for the candidate album back to M; this ensures good separability between the cleansed album and its most similar neighboring album. At this point, the new candidate network state is applied, and the process ends.

In summary, the network is updated by periodically clustering the current network with new trips from the buffers. The network absorbs new trips while removing old trips. The new trips are removed from the buffers and the remaining trips stay in the buffers. Immediately after a network update, the buffer assignments are updated to assign the buffered trips that have expired—for example, trips that exceeded the number of allowed days to be in the buffer (e.g., 2N, 3N, 4N, 5N, or any other appropriate number, wherein N is the number of days since the last system update). Buffer assignments are updated by combining all trips from the buffers with the trips in the new applied network and re-running the GCN cluster analysis. Updated assignments of trips in the buffer (e.g., hard or soft assignments) are made according to whether they clustered or not, and final hard or soft status assignments are made for expired trips. For example, final hard or final soft assignments are made for trips in the buffers and then stored in a database (e.g., the database in the driver identification system).

In some embodiments, when a new trip is assigned to an existing album, and in the event that the album contains the desired driver ID (e.g., the driver's name), the new trip is updated to include the desired driver ID. When a new trip is assigned to a new or existing album, and in the event that the album does contain the desired driver ID, the user is queried to provide the desired driver ID.

In some embodiments, in order to associate new albums with existing albums, the migration of trips is tracked from the previous network state to the new candidate network state. It is possible that two albums in a past state were combined into one album for the new candidate network state, or that one album from the past state was split into two for the new candidate network state. Typically, existing past albums are assigned a desired driver ID (e.g., the driver name), so new candidate albums are able to be automatically updated with a desired driver ID based on an identified driver ID from past albums. For new albums where there is no existing desired driver ID linkage, the user is queried to provide the desired driver ID.

FIG. 1 is a block diagram illustrating an embodiment of a system including a vehicle event recorder and driver identification system. In the example shown, when vehicle 106 travels, vehicle event recorder 102 and vehicle sensors 104 capture sensor data (e.g., image data, audio/video data, global positioning system data, accelerometer data, braking data, lane data, etc.). The sensor data is measured or received by vehicle event recorder 102. The sensor data from a vehicle sensor (e.g., image data) is captured by the event recorder and is annotated with labels (i.e., metadata) that identify, describe, classify, and/or otherwise characterize images obtained from the vehicle sensor (e.g., images obtained from a digital still camera, a digital video camera, etc.). For example, the metadata annotations include information about when and where the image was taken, information about the driver and/or vehicle at the time the image was acquired, etc. The sensor data (e.g., image data) and/or metadata (e.g., image time, image location, vehicle status, etc.) are used to determine a driver's identity (ID) by driver identification system 110. In some embodiments, the driver ID and/or vehicle status are used to provide statistics and monitoring information to user system 112.

In various embodiments, the sensor data and/or metadata are also used to determine a driver's status while operating the vehicle. In various embodiments, the driver's status includes one or more of the following: geographic location, actively driving, stopped (e.g., stopped while in the vehicle, while external to the vehicle, while the vehicle is running, and/or while the vehicle is not running), length of time stopped, distance and/or time traveled, distance and/or time traveled between stops, distance and/or time to destination, etc.

In various embodiments, vehicle event recorder 102 also uses the data to determine events (e.g., collision events, hazardous maneuver events, distracted driving events, etc.). For example, when the vehicle event recorder 102 determines an event (e.g., a collision event), it begins a process for identifying whether an inappropriate driving behavior is associated with the event. This association can be used to determine whether the event was potentially caused by an inappropriate driving behavior. For example, it may be determined that the driver departed the lane because of distraction from talking on a cell phone.

Vehicle event recorder 102 comprises a vehicle event recorder mounted in a vehicle (e.g., a car or truck). Vehicle event recorder 102 has its own sensors and is also in communication with vehicle sensors 104. Vehicle event recorder 102 sensors comprise a set of sensors—for example, an exterior video camera, an exterior still camera, an interior video camera, an interior still camera, a microphone, an accelerometer, a gyroscope, an outdoor temperature sensor, a moisture sensor, a laser line tracker sensor, vehicle state sensors, or any other appropriate sensors. Vehicle sensors 104 comprise a set of sensors—for example, a speedometer, an accelerator pedal sensor, a brake pedal sensor, an engine revolution per minute (RPM) sensor, an engine temperature sensor, a headlight sensor, an airbag deployment sensor, driver and passenger seat weight sensors, an anti-locking brake sensor, an engine exhaust sensor, a gear position sensor, a turn signal sensor, a cabin equipment operation sensor, or any other appropriate vehicle state sensors.

Vehicle event recorder 102 comprises a system for receiving and processing sensor data (e.g., Audio/Visual (A/V) data, wherein A/V data also comprises image data). Processing sensor data comprises compressing data, filtering data, identifying patterns in data, detecting events, etc. Vehicle event recorder 102 is mounted on vehicle 106 in any appropriate location—for example the chassis, the front grill, the dashboard, the rear-view mirror, the rear window or wall, the floor, etc. There are times when vehicle event recorder 102 comprises multiple units mounted in different locations within vehicle 106 instead of a single unit, particularly when there are space constraints for a given location (e.g., behind the rear-view mirror) and more space is required to house electronic components.

Vehicle event recorder 102 comprises a communications system for communicating with network 100. Network 100 comprises a network for communications. Network 100 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, etc. There are instances when network 100 comprises multiple networks, for instance, multiple interconnected networks spanning different regions, networks operating at different times, overlaid networks with different access permissions, networks with different bandwidth, etc. Different networks comprising network 100 typically comprise different bandwidth cost (e.g., a wired network has a very low cost, a wireless Ethernet connection has a moderate cost, a cellular data network has a high cost, etc.). In some embodiments, network 100 has a different cost at different times (e.g., a higher cost during the day and a lower cost at night). Vehicle event recorder 102 communicates with vehicle data server 108 via network 100.

Vehicle event data collected by vehicle event recorder 102 is sent to vehicle data server 108. Vehicle data server 108 transmits received vehicle event data (e.g., a set of images and associated metadata) to driver identification system 110 to be used to generate vector-based face embeddings (e.g., using one or more deep learning models within the driver identification system processor). Driver identification system 110 combines the received face embeddings into vector-based trip embeddings (e.g., for a given driving session). The trip embeddings, and associated metadata, are analyzed by the driver identification system processor (e.g., using a graph convolutional network (GCN) and clustering model) to generate new or updated albums (e.g., a network of albums comprising collections of self-similar trips that represent a given driver). In various embodiments, driver identification system 110 uses the new and/or updated albums to initialize a network and/or to update an existing network of albums. In some embodiments, a user of user system 112 accesses driver identification system 110 to determine a driver ID and/or vehicle status.

In some embodiments, vehicle event data in the form of A/V data (i.e., video data) is recorded on vehicle event recorder 102 as full-resolution uncompressed video. In some embodiments, A/V event data is made available for upload to vehicle data server 108 in both uncompressed full-resolution and compressed lower-resolution formats. In various embodiments, the format type for upload to vehicle data server 108 is determined in part by considering the cost of the available methods of transmission. For example, transmission of large amounts of video data via a cellular data network while the vehicle is en route can be much more costly than using a local Wi-Fi service at select vehicle stopping points. Transmission of a compact data set (e.g., a smaller sized video summary) en route provides more timely access to event data than high-resolution data access limited to select vehicle stopping points (e.g., that may occur only once or twice a day).

In some embodiments, vehicle event data recorded on vehicle event recorder 102 is processed to generate an image vector representation of a driver (i.e., a face embedding). In some embodiments, the vehicle event recorder processor generates a metadata label for each face embedding and combines that information with the face embedding for transmission to vehicle data server 108. In some embodiments, the face embeddings, along with the metadata labels that are generated, are then subsequently transmitted to the vehicle data server.

In some embodiments, vehicle event data recorded on vehicle event recorder 102 is processed to generate summary image vectors that characterize vehicle event data over a short time scale (e.g., 5 seconds, 10 seconds, 15 seconds, or any other appropriate short time scale). In some embodiments, the vehicle event recorder processor generates a short time scale label for each summary image vector and embeds that information for transmission to vehicle data server 108 as an embedded image vector. In some embodiments, the embedded image vectors, along with the labels that are generated, are then subsequently transmitted to the vehicle data server.

In some embodiments, a short time scale labeling model is generated to run on vehicle event recorder 102. The short time scale labeling model comprises a version tailored for the processor and/or memory of vehicle event recorder 102 (e.g., a less processor intensive version and/or less memory intensive version).

In some embodiments, the short time scale labeling model in vehicle event recorder 102 is used to label new events received via vehicle sensors 104. In some embodiments, the video event data used by the short time scale labeling model is lower-resolution compressed video to limit demand on the processor in vehicle event recorder 102 (e.g., the vehicle event recorder processor is much less powerful than a processor that can be incorporated into vehicle data server 108). In some embodiments, a labeling model that resides in vehicle data server 108 (i.e., a long time scale model) utilizes a more powerful processor to analyze the received set of vehicle data.

In some embodiments, the data can be analyzed by a set of reviewers (e.g., a set of human reviewers). The reviewers annotate the events in the vehicle event data with labels that identify, describe, classify, and/or otherwise characterize the events (e.g., by reviewing long time scale video data, video data leading up to each event, and/or video data after event, etc.). In some embodiments, the labeled event data is used to provide statistics and monitoring information to user system 112.

Figure 2A:
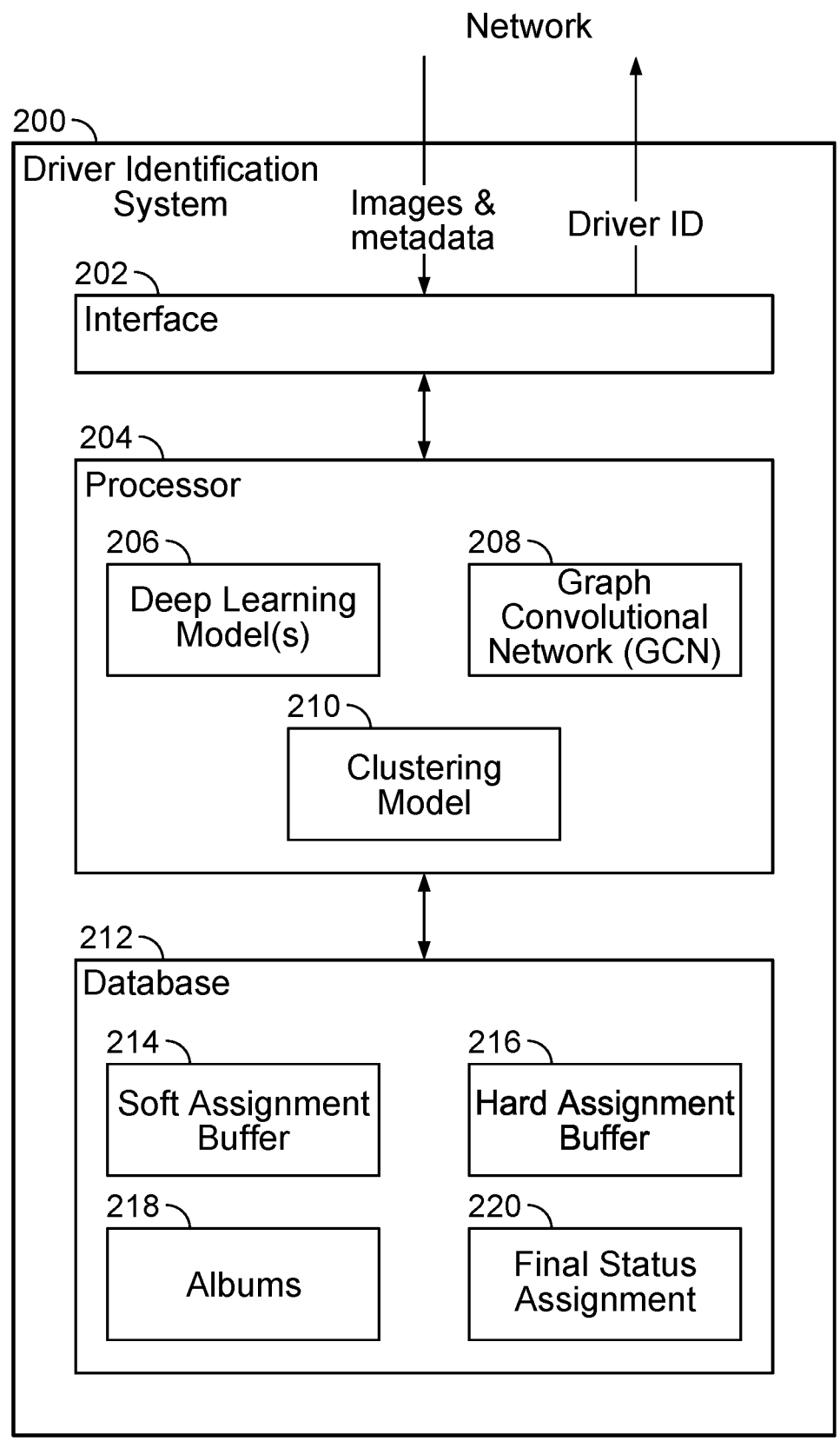
FIG. 2A is a block diagram illustrating an embodiment of a driver identification system.

FIG. 2A is a block diagram illustrating an embodiment of a driver identification system. In some embodiments, driver identification system 200 of FIG. 2A is used to implement driver identification system 110 of FIG. 1.

In the example shown, driver identification system 200 receives vehicle data information via a communications network using interface 202, including images and metadata, vehicle event data, sensor data, vehicle information, and raw data associated with a vehicle with a mounted vehicle event recorder. Received vehicle event data is stored in database 212.

In various embodiments, received vehicle event data is filtered and categorized for various criteria (e.g., via processor 204)—for example, what vehicle event recorder it came from, the date recorded, the quality of video, which side of vehicle the driver is on (e.g., left side or right side based on geographic region), etc. In various embodiments, the vehicle event data is further processed into a form suitable for efficient analysis or review—for example, event video data is reduced to a number of frames associated with an event and/or video frames or still images are cropped to the immediate proximity of the driver. In various embodiments, the filtering, categorizing, and/or further processing is performed by a vehicle data server prior to transmission to driver identification system 200.

In various embodiments, raw, filtered, categorized, and/or otherwise processed vehicle event data is used by processor 204 to construct face embeddings, combine faces into trips, construct albums, assign new trips to albums, name the albums, update the albums (e.g., update a network of albums), and/or determine a driver ID.

In various embodiments, the driver's ID includes one or more of the following: a name, a badge number, a fingerprint, a facial identifier (e.g., a facial feature embedding wherein facial features are represented by a vector of numbers), a voice identifier, a driving pattern identifier (e.g., a pattern derived from the time of day, speed, distance traveled, number of stops, acceleration, brake, and/or steering wheel data, etc.), driver related features (e.g., heart-rate), and vehicle or trip related features (e.g., a vehicle ID, a trip ID, and/or an ignition ID, wherein an ignition ID comprises a unique driving session identifier, etc.).

In various embodiments, raw, filtered, categorized, and/or otherwise processed vehicle event data is sent to a set of reviewers (e.g., a human reviewer) to be annotated with labels (i.e., metadata) that identify (e.g., via a driver ID), describe, classify, and/or otherwise characterize the images and/or events in the vehicle event data. In various embodiments, the reviewed and annotated vehicle event data is transmitted back to driver identification system 200 for constructing face embeddings, combining faces into trips, constructing albums, assigning new trips to albums, naming the albums, updating the albums, and/or determining a driver ID.

Processor 204 uses deep learning model(s) 206 to generate vector-based face embeddings and graph convolutional network (GCN) 208 to generate vector similarity metrics used to measure the similarity between two face embeddings. Clustering model 210 is used to group faces (i.e., face embeddings) in such a way that faces in the same group (called a cluster) are more similar to each other than to faces in other clusters.

In various embodiments, there are one or more deep learning models used to create the face embeddings. In some embodiments, there are three deep learning models used to create the embeddings. In some embodiments, the three deep learning models comprise a bounding box model (e.g., bounding boxes around both the face and body of the driver), a pose model (e.g., a pose comprising the pitch and yaw of the face image relative to the vehicle frame), and a 'face2vec' model (e.g., the conversion of the driver face image to a vector embedding).

For example, the bounding box model takes images as input and predicts bounding boxes around both the face and body of the driver. The pose model takes the image and bounding boxes as input and predicts the head pose of the driver as output (e.g., pitch and yaw). The face2vec model takes as input the image, bounding boxes, pixel estimations of center of the face (e.g., based on the bounding box), pose estimates, and brightness score (i.e., a measure of sunlight conditions based on date, local time, and location) to generate an n-dimensional face embedding (i.e., a feature vector)—wherein n equals 128, 256, 512, or any other appropriate number of dimensions—that best represents the unique features of that driver. In some embodiments, an ArcFace implementation is used to perform the functions of the face2vec model.

Once all the faces (i.e., face embeddings) from a given vehicle and ignition (i.e., a driving session) are received, they are combined into trips (e.g., using processor 204). First, faces that belong to the same trip ID—wherein the same trip ID is assumed to be part of a 'non-stop' driving session—are assumed to be one driver. Then, faces from two contiguous trip IDs are compared against each other to determine if two trip IDs should be combined into one trip. In some embodiments, cosine similarity between embeddings is used to determine whether two trip IDs should be combined into one trip. This procedure is repeated until a complete list of trips is generated for a given ignition.

Each trip is represented by a trip embedding, which combines face embeddings of that trip in the following ways: (i) construct two ordered lists of faces, (ii) rank order each list by bounding box proximity to the average face box, and (iii) rank order each list by pose that is closest to the average pose. Next, an average rank is generated between the two ordered lists, excluding faces that have bounding box confidence below a threshold level of confidence (e.g., below a 40%, 50%, 60%, or any other appropriate level of confidence). The top 50% of faces from the final list are then selected. In the event that the number of selected faces is above three, an average face embedding is generated from the selected faces to represent the trip embedding. These trip embeddings are considered high quality (HQ). In the event that the number of selected faces is three or less, all of the faces are selected from the list, wherein these trip embeddings are considered low quality (LQ). 'Trips' comprise a trip embedding, a start and end time, and a start and end location.

Graph convolutional network (GCN) 208 takes a list of trips as inputs (i.e., trip embeddings and associated time and location information) to generate a matrix of trip similarities for all provided trips. The GCN learns how to use additional context (e.g., additional context available from other trips within a network of albums) to generate trip similarities better than just using pairwise cosine similarity. The output of graph convolutional network (GCN) 208 is a weighted graph, where the nodes are trips and edges are similarity scores. Clustering model 210 is used to generate clusters of self-similar trips (i.e., trips comprising one driver). In some instances, clustering model 210 also generates single-node clusters (i.e., a cluster that doesn't group with any other cluster).

Clusters greater than a minimum size (e.g., 3, 4, 5, 6, 7, or any appropriate minimum size) are hard assigned to albums and stored in the hard assignment buffer 216 of database 212. In some embodiments, during system initialization, clusters greater than a minimum size are also stored in albums 218 to become the first albums to initialize the network. Clusters less than a minimum size are soft assigned to the newly initialized albums and placed in soft assignment buffer 214. Trips in soft assignment buffer 214 and hard assignment buffer 216 undergo final assignment when they exceed a maximum time in the buffers (i.e., 'expire')—for example, 3 days, 4 days, 5 days, or any other appropriate maximum time—and are placed in final status assignment 220. In various embodiments, the network of albums stored in albums 218 and/or hard assignment buffer 216 are used by processor 204 to determine a driver ID. In some embodiments, in the event that processor 204 is unable to determine a driver ID, the system user is presented a number of images (e.g., 2, 3, 4, or any other appropriate number of images) from unidentified albums and asked to provide the driver ID.

After N days since the last network update (e.g., N=2, 3, 4, 5 or any other appropriate number), trips that have accumulated in soft assignment buffer 214 and hard assignment buffer 216 are assembled (e.g., by processor 204) into candidate trips (i.e., trips that may enter the network after further analysis). HQ trips from both soft assignment buffer 214 and hard assignment buffer 216 are run through GCN 208 to ensure that the candidate trips self-cluster amongst themselves. Trips that form clusters of a minimum size (e.g., 3, 4, 5, 6, 7, or any appropriate minimum size) move onto the next stage of album candidacy, wherein the candidate trips are combined with the trips in albums 218 and run through graph convolutional network (GCN) 208 and clustering model 210 to confirm existing trip assignments or to generate new albums. All trips that did not make it into a new cluster remain in soft assignment buffer 214 and hard assignment buffer 216.

Finally, each album in albums 218 undergoes review for age and similarity. A maximum number of trips is allowed in an album (e.g., 25, 30, 35, 44, 56, or any other appropriate maximum number of albums). In the event that there are E number of excess trips, a fraction of E of the oldest trips are removed (e.g., ⅓, ⅖, ½, ⅔, or any appropriate fraction are removed). Trips that are most similar to the nearest neighbor album are removed until the number of trips in the album is at or below the maximum allowed size. In summary, the network albums are updated periodically by clustering the albums in albums 218 with new HQ trips from soft assignment buffer 214 and hard assignment buffer 216. The network absorbs new trips while removing old trips. New trips are removed from the buffers and the remaining trips stay in soft assignment buffer 214 and hard assignment buffer 216.

Updated assignments of trips in the buffer (e.g., hard or soft assignments) are made according to whether the trips clustered or not (e.g., clustered above a minimum size or threshold level of confidence), and final hard or soft status assignments are made for expired trips and placed into final status assignment 220.

Figure 2B:
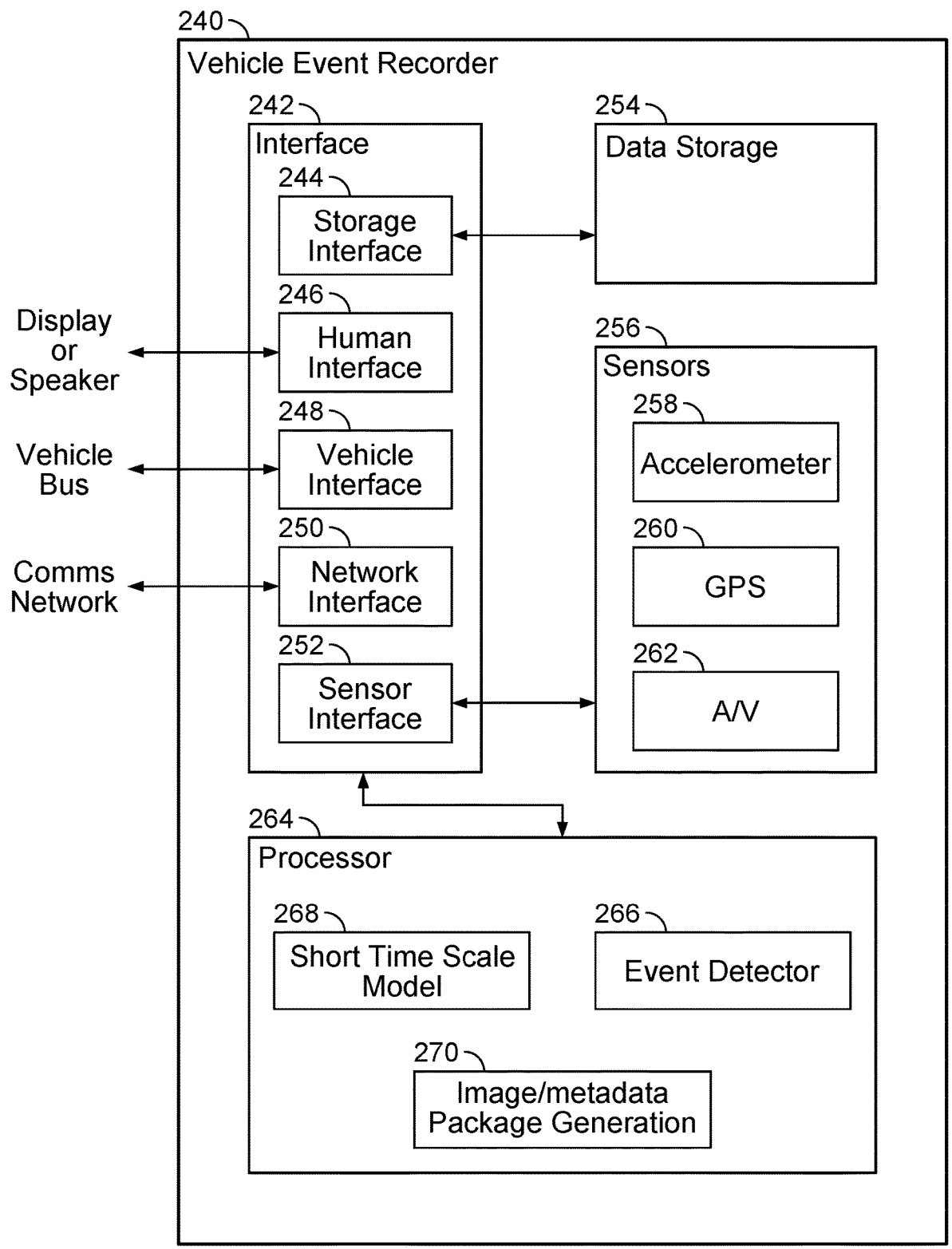
FIG. 2B is a block diagram illustrating an embodiment of a vehicle event recorder.

FIG. 2B is a block diagram illustrating an embodiment of a vehicle event recorder. In some embodiments, vehicle event recorder 240 of FIG. 2 is used to implement vehicle event recorder 102 of FIG. 1. In the example shown, vehicle event recorder 240 monitors sensor signals from internal sensors 256 (e.g., accelerometer 258, GPS sensor 260, audio/visual (A/V) sensor 262) or from vehicle sensors via vehicle interface 248.

Vehicle event recorder 240 communicates with a vehicle data server using network interface 250 (e.g., using a wired or wireless network such as a WiFi™ or cellular network). Vehicle event recorder 240 transmits sensor data, image data (e.g., driver image data), audio/visual (A/V) data, vehicle data, vehicle identification data, anomalous event data, driver quality data, etc. to a vehicle data server.

In various embodiments, image data, A/V data, video images, clips, and/or streams comprising vehicle event data comprise various color bit depths (e.g., 16, 24, 32, 48-bit color, etc.), monochrome color (e.g., black and white, greyscale, or coloring that utilizes different shades of a single color, etc.), video resolution (e.g., 480, 720, 1080, 4K, 8K, etc.), and may be compressed (e.g., using any useful coding standard(s) of the various Joint Photographic Experts Group (JPEG), Moving Picture Experts Group (MPEG), International Telecommunication Union (ITU) standards, or any other appropriate coding standard) or uncompressed full-frame video stored at the native frame rates and resolution of an A/V sensor (e.g., A/V 262).

In various embodiments, each driver image is labeled with metadata comprising an ignition ID (i.e., a unique driving session identifier), a trip ID (e.g., a trip ID that is assigned to images that are connected by periods of long non-stop driving), a vehicle ID, a timestamp, an estimation of sunlight level, a vehicle speed summary, and/or a GPS latitude/longitude. In some embodiments, images and the associated metadata are uploaded, and no further processing is done on the images on the event recorder. In some embodiments, images and the associated metadata are further processed on the event recorder (e.g., converted to vector form, accumulated into trips, compared for similarity rankings, etc.).

Vehicle event recorder 240 comprises interface 242. Interface 242 comprises a set of interfaces to other systems. Human interface 246 comprises an interface to a human interaction system—for example, an audio output (e.g., a speaker), a display output, a haptic output, etc. Sensor interface 252 comprises an interface to one or more sensors for receiving sensor data. Sensor interface 252 comprises an interface to one or more vehicle event recorder sensors. In various embodiments, vehicle event recorder sensors comprise an exterior video camera, an exterior still camera, an interior video camera, an interior still camera, a microphone, an accelerometer, a gyroscope, an outdoor temperature sensor, a moisture sensor, a laser line tracker sensor, or any other appropriate sensors. Vehicle interface 248 interfaces with vehicle state sensors possibly including a speedometer, an accelerator pedal sensor, a brake pedal sensor, an engine RPM sensor, an engine temperature sensor, a headlight sensor, an airbag deployment sensor, driver and passenger seat weight sensors, an anti-locking brake sensor, shocks sensors, an engine exhaust sensor, a gear position sensor, a turn signal sensor, a cabin equipment operation sensor, or any other appropriate vehicle state sensors. In some embodiments, vehicle interface 248 comprises a connection to a vehicle bus such as an on-board diagnostics (OBD) bus (e.g., society of automotive engineers (SAE) J1939, J1708/J1587, OBD-II, CAN BUS, etc.). In some embodiments, vehicle event recorder 240 communicates with vehicle state sensors via the OBD bus.

Vehicle interface 248 further comprises an interface to one or more vehicle systems (e.g., for adjusting vehicle control parameters, for putting the vehicle in a safe mode, etc.). Network interface 250 comprises a network interface for communicating with other systems via a network. Network interface 250 comprises one or more of a GSM interface, a CDMA interface, an LTE interface, a WiFi interface, an Ethernet interface, a Universal Serial Bus (USB) interface, a Bluetooth™ interface, an Internet interface, etc. Processor 264 comprises a processor for controlling the operations of vehicle event recorder 240, for reading and writing information on data storage 254, for reading and/or writing data via storage interface 244, etc. Processor 264 also comprises event detector 266 for determining events (e.g., collision events, hazardous maneuver events, distracted driving events, etc.) and short time scale model 268 for classifying and labeling the determined events (e.g., cell phone use, eating, drinking, smoking, not looking ahead, not wearing seat belt, etc.).

In some embodiments, short time scale model 268 comprises a machine learning model, a neural network, or any other appropriate model. In some embodiments, the short time scale model comprises a convolutional neural network, a recurrent neural network, and a fully connected layer. In some embodiments, the convolutional neural network receives a video frame and outputs an image vector representation of that frame. In some embodiments, the recurrent neural network receives the image vectors from the convolutional neural network and outputs a summary image vector that represents ten, or any other appropriate small number of, image vectors. In some embodiments, the fully connected layer is used to analyze and label each summary image vector for one or more class of driver behaviors; determine the probability associated with each driver behavior classification; and generate embedded image vectors by assigning the determined class labels and probabilities to each summary image vector. Event detector 266 is used to detect events and flag or mark an index for received A/V clips or within the continuous stream(s) of A/V data.

Data storage 254 comprises a data storage (e.g., a random-access memory (RAM), a read only memory (ROM), a nonvolatile memory, a flash memory, a hard disk, or any other appropriate data storage). Data storage 254 stores clips or continuous stream(s) of audio/video data from A/V 262. Data storage 254 comprises a data storage for storing instructions for processor 264, vehicle event recorder data, vehicle event data, sensor data, A/V data, driver scores, vehicle information, vehicle identifying information, anomalous event information, driver quality information, bad behavior indications, etc.

Processor 264, after utilizing short time scale model 268 to label events from A/V clips or streams, routes the labeled event data to data storage 254 for later retrieval at select vehicle stopping points, and/or compresses the A/V clips or streams for transmission to the vehicle data server via interface 242. Network interface 250 is used to receive updates to short time scale model 268 as it is updated and improved.

In some embodiments, processor 264 utilizes image/metadata package generation 270 to associate (i.e., 'package') metadata related to an image (e.g., an image of the driver) into a single data file for transmission to a vehicle data server. In some embodiments, image/metadata package generation 270 is used to extract individual images from video data (e.g. 'still' images). In various embodiments, image/metadata package generation 270 is used to package a set of one or more images, each with its associated metadata, into one or more data files for transmission to a vehicle data server. For example, a set of one or more individual single data files are packaged into a single file for transmission, are first compressed then packaged into a single file for transmission, are first packaged and then compressed for transmission, or any other appropriate method of packaging for transmission. File compression and packaging techniques can be lossless or lossy (e.g., using the '.tar' file format, the '.zip' format, the 'gzip format, the '.gz' format, etc.). Still image compression format examples include various Joint Photographic Experts Group (JPEG) file formats, the Portable Network Graphics (PNG) file format, the Graphics Interchange Format (GIF), the Tag Image File Format (TIFF), etc. A/V data compression format examples include motion JPEG, JPEG 2000, various Motion Picture Expert Group (MPEG) formats (e.g., MPEG-1. MPEG-2, MPEG-3, MPEG-4, H.264, H.265, MPEG-7, MPEG-21, etc.), the Audio Video Interleave (AVI) format, the Windows Media Video (WMV) format, etc.

Figure 3:
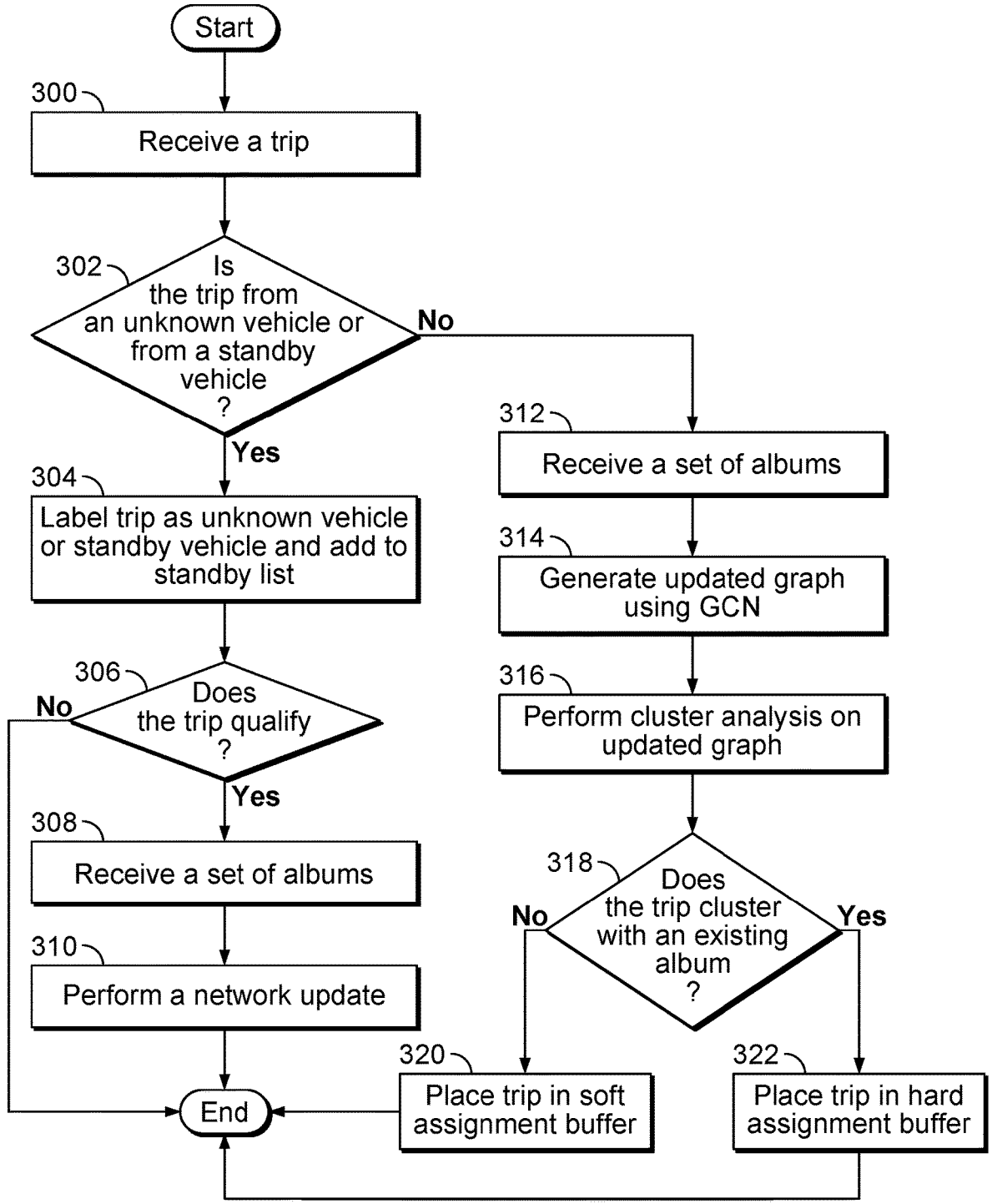
FIG. 3 is a flow diagram illustrating an embodiment of a process for assigning new trips.

FIG. 3 is a flow diagram illustrating an embodiment of a process for assigning new trips. In some embodiments, the process of FIG. 3 is executed by driver identification system 200 of FIG. 2. In the example shown, in 300, a trip is received. For example, a trip comprising a trip embedding, a start and end time, and a start and end location is received from the deep learning model(s) of the driver identification system.

In 302, it is determined whether the trip is from an unknown vehicle or from a standby vehicle. For example, it is determined whether the trip is from a vehicle that has not yet been registered in the driver identification system (i.e., an unknown vehicle) or from an in-network vehicle that has not yet accumulated enough HQ trips to be admitted to the network (i.e., a standby vehicle). In response to determining that the trip is neither from an unknown vehicle nor from a standby vehicle, control passes to 312. For example, it is determined that the trip is from a vehicle that is registered in the driver identification system and has a qualifying number of HQ trips above a minimum threshold (e.g., three, four, five, or any other appropriate number). In response to determining that the trip is from an unknown vehicle or a standby vehicle, the process flows to 304. For example, it is determined that the trip is from a vehicle not registered in the driver identification system.

In 304, the trip is labeled as an unknown vehicle or a standby vehicle and added to a standby list. For example, a trip that is not registered in the driver identification system is labeled as an unknown vehicle and added to a standby list. In some embodiments, the number of trips on the standby list is tracked. In various embodiments, when the number of trips on the standby list assigned to the same vehicle ID exceeds the minimum number of HQ trips to be assigned to the network, an indication is provided to the user and/or the trips are processed for network admission at the next system update.

In 306, it is determined whether the trip qualifies. For example, it is determined whether the trip has caused the number of HQ trips for that vehicle to meet the number of HQ trips required for network participation, or whether the trip embedding of the trip is of low quality (LQ). In various embodiments, in the event that the trip does not meet the number of HQ trips required for network participation, or in the event that the trip is of low quality, the trip does not qualify. In response to determining that the trip does not qualify, the process ends.

In response to determining that the trip qualifies, the process flows to 308. In 308, a set of albums is received. For example, a set of albums associated with a specific user of the driver identification system is received from the database of the driver identification system. In 310, a network update is performed, and the process ends. For example, the trip and set of albums are analyzed by the Graph Convolutional Network (GCN) and clustering models of the driver identification system to determine whether the trip should be hard or soft assigned to the buffers of the driver identification system, whether the trip should be assigned to a new or existing album, whether the trip has caused any album size to exceed a maximum size, whether the trip contains a driver ID, whether any existing trips have expired, or whether any system assignments require updating, and the process ends.

In 312, a set of albums is received. For example, a set of albums associated with a specific user of the driver identification system is received from the database of the driver identification system. In 314, an updated graph is generated using a Graph Convolutional Network (GCN). For example, a weighted graph comprising nodes and edges is produced by using the GCN to analyze the trip in combination with the received set of albums.

In 316, cluster analysis is performed on the updated graph. For example, a clustering model of the driver identification system is used to generate updated clusters of trips using both the received trip and the trips within the received set of albums.

In 318, it is determined whether the trip clusters with an existing album. For example, it is determined whether the trip clusters (e.g., above a minimum cluster size or threshold level of confidence) with an album from the received set of albums. In response to determining that the trip clusters with an existing album, the process flows to 320. In 320, the trip is placed in a soft assignment buffer, and the process ends. For example, the trip is placed in the soft assignment buffer of the driver identification system, and the process ends.

In response to determining that the trip does not cluster with an existing album, control passes to 322. In 322, the trip is placed in a hard assignment buffer, and the process ends. For example, the trip is placed in the hard assignment buffer of the driver identification system, and the process ends. In some embodiments, the qualified provisionally assigned trips are qualified by self-clustering. In some embodiments, the qualified provisionally assigned trips are qualified by being high quality trips.

Figure 4:
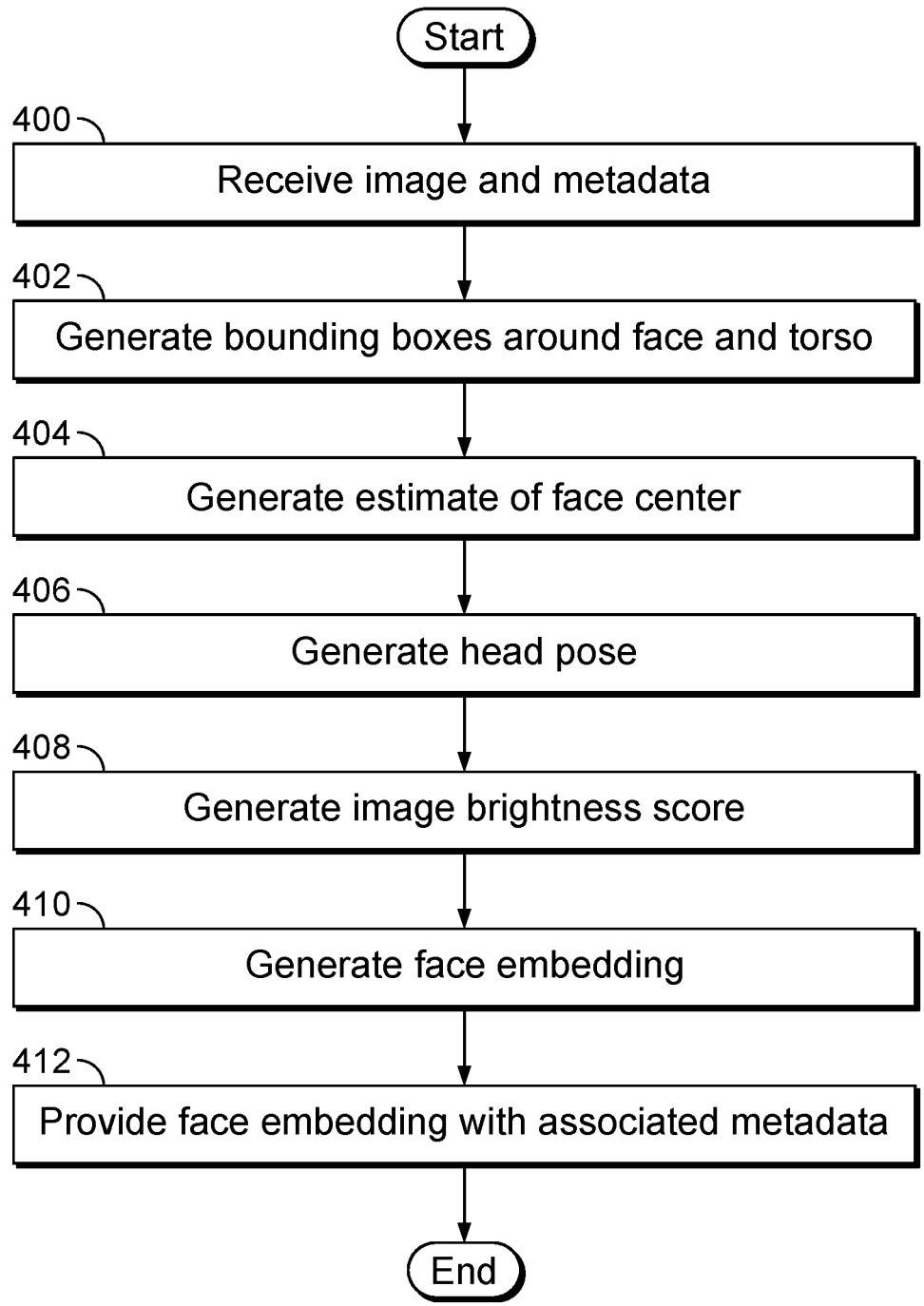
FIG. 4 is a flow diagram illustrating an embodiment of a process for generating a face embedding.

FIG. 4 is a flow diagram illustrating an embodiment of a process for generating a face embedding. In some embodiments, the process of FIG. 4 is executed by driver identification system 200 of FIG. 2. In the example shown, in 400, an image and metadata are received. For example, a driver image labeled with metadata is received by a driver identification system processor.

In 402, bounding boxes are generated around face and torso. The torso box is used to crop the image to contain only the driver's face and body. This cropped image is one of the inputs for FACE2VEC and is also the input for the face pose model. For example, bounding boxes are generated around the face and torso of a driver image using a deep learning bounding box model (e.g., an object recognition and segmentation model). In some embodiments, a rectangular bounding box is generated using the x and y axis coordinates of the upper-left corner of the driver face or torso and the lower-right corner x and y axis coordinates of the driver face or torso. In some embodiments, a rectangular bounding box is generated using the x and y axis coordinates of the bounding box center, and its width and height. In various embodiments, the bounding box comprises a non-rectangular shape that encompasses a driver face or torso (e.g., a non-rectangular polygon, a circle, an ovoid, an ellipse, or any other appropriate bounding box shape). In various embodiments, the deep learning bounding box model comprises one or more of a Tensor Flow model (e.g., a Tensor Flow application programming interface (API)), a convolutional neural network, a region-based convolutional neural network (R-CNN), a Fast R-CNN model, a Faster R-CNN model, a you only look once (YOLO) model from the family of YOLO models, an EdgeBoxes model, or any other appropriate bounding box model.

In 404, an estimate of face center is generated. For example, a pixel estimation of the driver's face center is generated. In some embodiments, the geometric center of the box bounding the driver's face is determined to generate an estimate of the face center. In various embodiments, the location of a specific region of the driver's face center (e.g., the driver's nose) is determined to generate an estimate of the face center.

In 406, a head pose is generated. For example, a deep learning pose model is used to generate the orientation of the driver's head (i.e., its 'pose'). In various embodiments, one or more of a set of axes comprising a pitch axis, a yaw axis, and a roll axis are used to specify a head pose. In some embodiments, the orientation of a torso box image is used to help in estimating a head pose. In various embodiments, the deep learning pose model comprises one or more of a Torch pose model, a PyTorch pose model, an OpenPose model, an AlphaPose model, a DeepCut pose model, a Keypoint R-CNN model, or any other appropriate pose model.

In 408, an image brightness score is generated. For example, an image brightness score is generated from an image of the driver's head. In various embodiments, an image brightness score is generated from an image of the driver's head, the driver's torso, and/or any portion of the driver image. In various embodiments, an image brightness score is generated using a set of image pixel values relative to the minimum and maximum pixel values possible (i.e., using pixel intensities), using pixel values relative to other pixel values (i.e., using pixel contrast), and/or any other appropriate measure of image brightness, contrast, or intensity. In various embodiments, an image brightness score is generated based on an arithmetic mean (e.g., the arithmetic mean of the red, green, and blue pixel values of a set of image pixels), a weighted mean, a geometric mean, a harmonic mean, using luma or luminance as a substitute for brightness, using the length of a color vector, or any other appropriate method to generate image brightness. In some embodiments, an image brightness score is generated based in part on the date, local time, and location where the driver image was taken. In some embodiments, the 'light score' is a geometric estimate of sunlight level given a local time and lat/lon, and it is not generated from the image and is agnostic to weather.

In 410, a face embedding is generated. For example, an image vector representation of a driver's face (i.e., a face embedding) is generated from one or more driver images. In various embodiments, any appropriate machine learning model (e.g., a neural network model, a convolutional neural network model, a recurrent neural network model, a Hopfield network model, a Boltzmann machine, a deep belief network, etc.) is used to generate an image vector representation of a driver's face (i.e., a 'face2vec' model). In various embodiments, the face2vec model takes as input the driver's image, the images within one or more bounding boxes, estimations of the center of the driver's face (e.g., based on the box bounding the driver's face), pose estimates of the driver's head, and/or image brightness score to generate an n-dimensional face embedding—wherein n equals 128, 256, 512, or any other appropriate number of dimensions—to represent the unique features of that driver.

In some embodiments, a deep convolutional neural network model (DCNN) is used to perform the functions of the face2vec model (e.g., a DCNN that uses loss functions to enhance discriminative ability of the model). In some embodiments, loss functions (or 'penalties') are designed based on the angular representation of features and weight-vectors. In some embodiments, an ArcFace implementation (e.g., using an additive angular margin penalty) is used to perform the functions of the face2vec model. In some embodiments, a CosFace implementation (e.g., using an additive cosine margin penalty) is used to perform the functions of the face2vec model. In some embodiments, a SphereFace implementation (e.g., using a multiplicative angular margin penalty) is used to perform the functions of the face2vec model.

In 412, a face embedding with associated metadata is provided, and the process ends. For example, a face embedding of the driver's face with a start time, an end time, a start location, an end location, a quality designation, and/or a vehicle identifier are provided to the driver identification system processor, and the process ends.

Figure 5A:
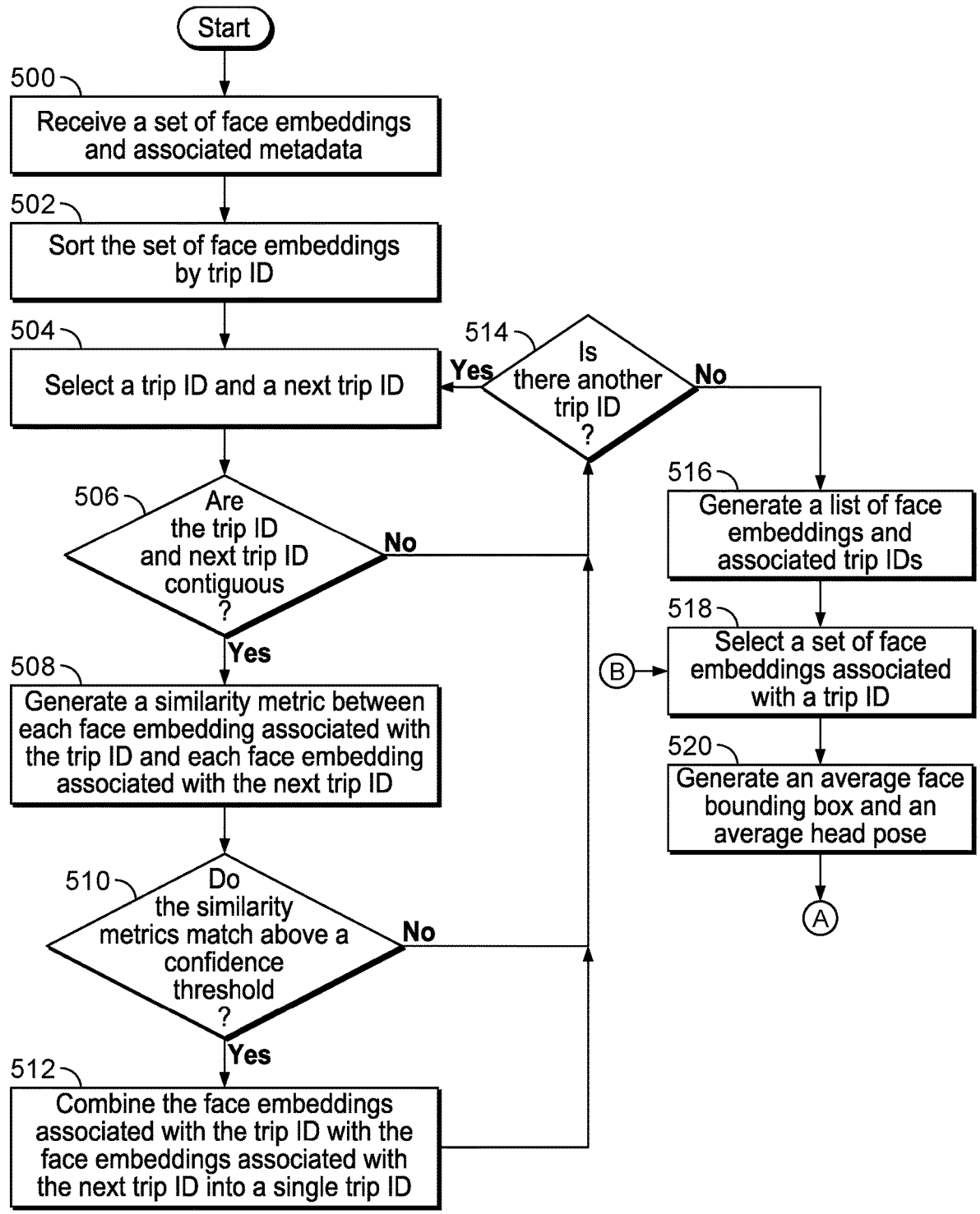
FIGS. 5A and 5B are a flow diagram illustrating an embodiment of a process for generating trips.
Figure 5B:
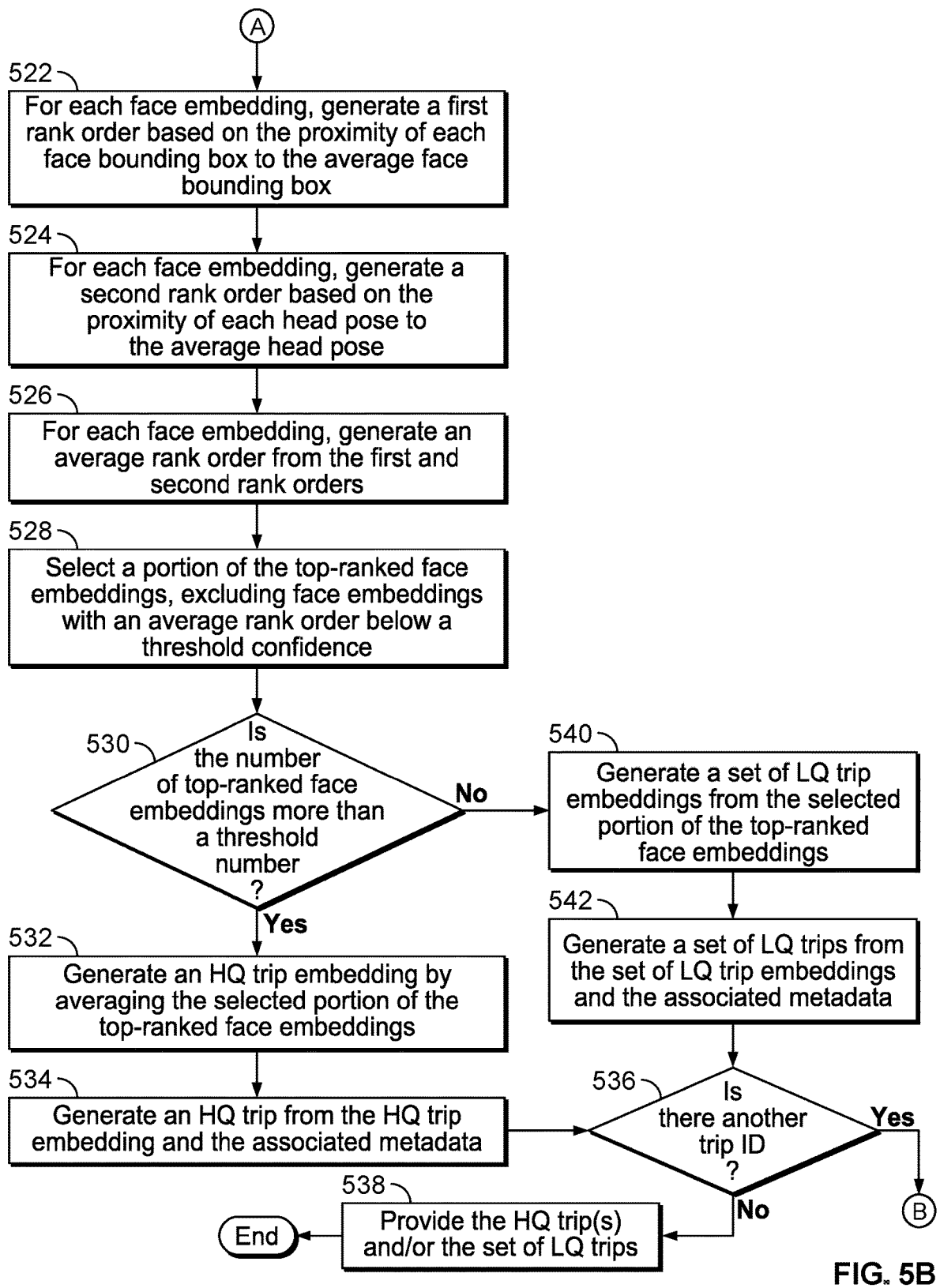

FIGS. 5A and 5B are a flow diagram illustrating an embodiment of a process for generating trips. In some embodiments, the process of FIGS. 5A and 5B is executed by driver identification system 200 of FIG. 2. In the example shown, in 500, a set of face embeddings and associated metadata is received. For example, a set of driver face embeddings and associated metadata from a given vehicle and ignition are received by a driver identification system processor.

In 502, the set of face embeddings is sorted by trip ID. For example, the set of face embeddings is sorted (e.g., into a list) by a software program operating within a driver identification system processor based on the trip ID associated with each face embedding. In various embodiments, the set of face embeddings is sorted by grouping face embeddings by trip ID, by ordering the face embeddings of a given trip ID by the time and/or date indicated in the associated metadata of the given trip ID, and/or by ordering the grouped and ordered face embeddings in ascending or descending order of the trip IDs, or sorted in any appropriate manner based on any appropriate criteria.

In 504, a trip ID and a next trip ID are selected. For example, a trip ID and a next trip ID are selected from the sorted list of trip IDs. In 506, it is determined whether the trip ID and next trip ID are contiguous. For example, it is determined whether the trip ID and next trip ID are next or together in sequence without allowing a large separation in time. In response to determining that the trip ID and next trip ID are not contiguous, control passes to 514. In response to determining that the trip ID and next trip ID are contiguous, the process flows to 508.

In 508, a similarity metric is generated between each face embedding associated with the trip ID and each face embedding associated with the next trip ID. For example, face embeddings from two contiguous trip IDs are compared against each other (e.g., using cosine similarity) to determine whether the two trip IDs should be combined into one trip.

In 510, it is determined whether the similarity metrics match above a confidence threshold. For example, it is determined whether the similarity metrics match above a confidence threshold of 50%, 58%, 65%, 72%, 85%, 93%, or any appropriate confidence threshold. In response to determining that the similarity metrics do not match above a confidence threshold, control passes to 514. In response to determining that the similarity metrics match above a confidence threshold, the process flows to 512.

In 512, the face embeddings associated with the trip ID are combined with the face embeddings associated with the next trip ID into a single trip ID. For example, the face embeddings associated with the trip ID are combined by a software program operating within a driver identification system processor with the face embeddings associated with the next trip ID into a single trip ID. In various embodiments, the combined face embeddings are assigned the trip ID of the first trip, the trip ID of the second trip, a new trip ID, or any other appropriate ID.

In 514, it is determined whether there is another trip ID. For example, it is determined whether there is another trip ID in the sorted list of face embeddings. In response to determining that there is another trip ID, control passes to 504. In response to determining that there is not another trip ID, the process flows to 516.

In 516, a list of face embeddings and associated trip IDs is generated. For example, a list of re-grouped face embeddings associated with new or updated trip IDs is generated. In 518, a set of face embeddings associated with a trip ID is selected. For example, a set of face embeddings from one or more contiguous trips combined into a single trip ID is selected.

In 520, an average face bounding box and an average head pose are generated, and the process flows to 522 of FIG. 5B. For example, a deep learning model of a driver identification system is used to generate an average driver face bounding box and an average driver head pose from a set of face embeddings and associated metadata. In various embodiments, one or more deep learning models are used to generate an average driver face bounding box and/or an average driver head pose. In various embodiments, one or more torso bounding box images are used to help in estimating an average head pose.

In 522, for each face embedding, a first rank order is generated based on the proximity of each face bounding box to the average face bounding box. For example, cosine similarity is used to generate a first rank score based on the proximity of a face bounding box to the average face bounding box, and the rank score of each face bounding box is used to generate a first rank order—for example, by generating a first rank order list (e.g., ranked from highest to lowest).

In 524, for each face embedding, a second rank order is generated based on the proximity of each head pose to the average head pose. For example, cosine similarity is used to generate a second rank score based on the proximity of a head pose to the average head pose, and the rank score of each head pose is used to generate a second rank order—for example, by generating a second rank order list (e.g., ranked from highest to lowest).

In 526, for each face embedding, an average rank order is generated from the first and second rank orders. For example, for each face embedding, an average rank score is generated by averaging the first rank score and second rank score of the face embedding, and the average rank score of each face embedding is used to generate an average rank order—for example, by generating an average rank order list (e.g., ranked from highest to lowest). In various embodiments, an average rank score is generated based on an arithmetic mean, a weighted mean, a geometric mean, a harmonic mean, or any other appropriate method to generate an average rank score.

In 528, a portion of the top-ranked face embeddings, excluding face embeddings with an average rank order below a threshold confidence, is selected. For example, half of the top-ranked face embeddings are selected, excluding face embeddings with an average rank order below a threshold confidence. In various embodiments, the threshold confidence is 40%, 50%, 58%, 65%, 72%, 85%, 93%, or any appropriate confidence threshold. In various embodiments, the portion of the top-ranked face embeddings is $\frac{1}{4}$, $\frac{1}{3}$, $\frac{1}{2}$, $\frac{2}{3}$, $\frac{3}{4}$, $\frac{5}{6}$, or any other appropriate portion.

In 530, it is determined whether the number of top-ranked face embeddings is more than a threshold number. For example, it is determined whether the number of top-ranked face embeddings is more than three. In various embodiments, the threshold number is two, three, four, five, six, or any other appropriate number. In response to determining that the number of top-ranked face embeddings is not more than a threshold number, control passes to 540. In response to determining that the number of top-ranked face embeddings is more than a threshold number, the process flows to 532.

In 532, an HQ trip embedding is generated by averaging the selected portion of the top-ranked face embeddings. For example, the selected portion of top-ranked face embeddings with an average rank order above a threshold confidence are used to generate an HQ trip embedding.

In some embodiments, a trip embedding comprises a representative face embedding. In some embodiments, an HQ trip embedding comprises a representative face embedding of high quality (HQ)—for example, of high quality as determined by a rank-ordering process (e.g., based on cosine similarity). In some embodiments, the representative face embedding comprises an average of a set of face embeddings from the trip. In some embodiments, the set of face embeddings comprises face embeddings with a similarity rank to one or more average images above a threshold. In various embodiments, the one or more average images comprise one or more of: an average face image, an average pose image, and an average torso image.

In various embodiments, an HQ trip embedding is generated by averaging the image vectors that comprise the top-ranked face embeddings. In various embodiments, averaging the image vectors comprises using the arithmetic mean, a weighted mean, a geometric mean, a harmonic mean, or any other appropriate method to generate an average vector image (i.e., an HQ trip embedding).

In 534, an HQ trip from the HQ trip embedding and the associated metadata is generated. For example, an HQ trip is generated by combining the HQ trip embedding with metadata from the associated face embeddings that comprise the HQ trip embedding. In various embodiments, the metadata from the associated face embeddings is summarized as a list comprising all or some of the metadata from the associated face embeddings. In some embodiments, the associated metadata combined with the HQ trip embedding is chosen from a representative associated face embedding (e.g., metadata from the associated face embedding with the highest rank score). In various embodiments, the associated metadata combined with the HQ trip embedding is generated in any appropriate manner from the metadata of the associated face embeddings.

In 536, it is determined whether there is another trip ID. For example, it is determined whether there is another trip ID on a list of face embeddings and associated metadata that have been sorted by trip ID. In response to determining that there is another trip ID, control passes to 518 of FIG. 5A. In response to determining that there is not another trip ID, the process flows to 538. In 538, the HQ trip(s) and/or the set of LQ trips are provided, and the process ends. For example, the HQ trip(s) and/or the set of LQ trips are provided to a graph convolutional network, and the process ends. In some embodiments, an LQ trip from the set of LQ trips comprises a set of face embeddings of low quality (LQ)—for example, of low quality as determined by a rank-ordering process (e.g., based on cosine similarity) that produces an insufficient number of top-ranked face embeddings (e.g., a number of top-ranked face embeddings less than a threshold number).

In 540, a set of LQ trip embeddings is generated from the selected portion of the top-ranked face embeddings. For example, a set of LQ trip embeddings is generated from the selected portion of the top-ranked face embeddings less than a threshold number. For example, a set of two LQ trip embeddings is generated from the selected portion of the top-ranked face embeddings, wherein the number of the selected top-ranked face embeddings is less than a threshold number of three, excluding face embeddings with an average rank order below a threshold confidence.

In 542, a set of LQ trips is generated from the set of LQ trip embeddings and the associated metadata, and control passes to 536 to determine whether there is another trip ID. For example, a set of LQ trips is generated by combining each LQ trip embedding of the set of LQ trip embeddings with the associated metadata from the face embeddings that comprise each LQ trip embedding, and control passes to 536 to determine whether there is another trip ID.

Figure 6:
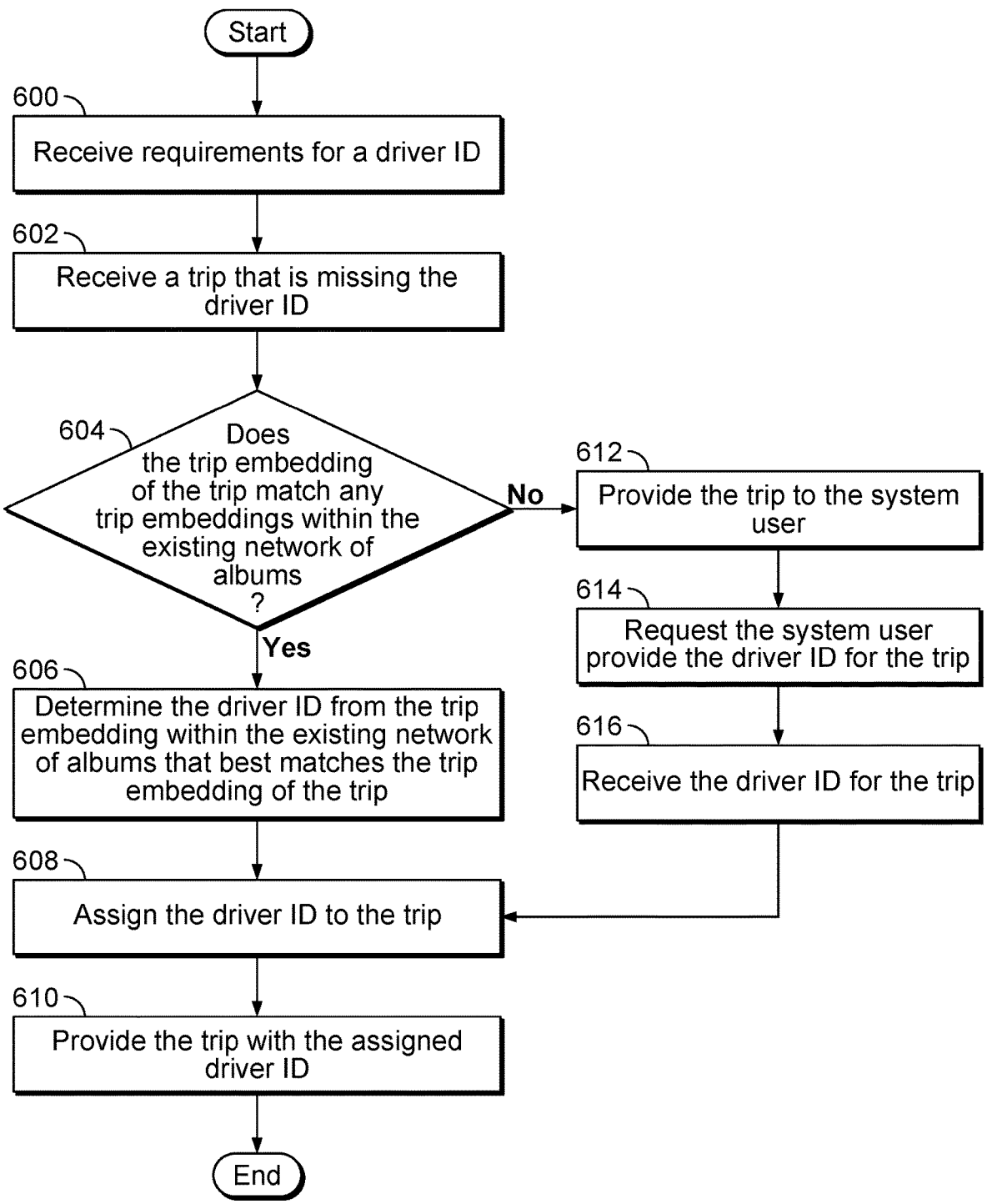
FIG. 6 is a flow diagram illustrating an embodiment of a process for assigning a driver ID to a trip.

FIG. 6 is a flow diagram illustrating an embodiment of a process for assigning a driver ID to a trip. In some embodiments, the process of FIG. 6 is executed by driver identification system 200 of FIG. 2. In the example shown, in 600, requirements for a driver ID are received. For example, requirements for a driver ID that are stored in a driver identification system database are received by a driver identification system processor. For example, the requirements of using a driver name and driver badge number as a driver ID are received. In various embodiments, requirements for a driver ID comprise requiring one or more of the following to be used as a driver ID: a name, a badge number, a fingerprint, a facial identifier, a voice identifier, a driving pattern identifier, one or more driver related features, or vehicle or trip related features.

In 602, a trip that is missing the driver ID is received. For example, a trip that is missing a driver ID is received by a driver identification system processor, wherein the driver ID comprises two requirements, would be considered to be missing the driver ID in the event that either or both of the two requirements was missing (e.g., the requirements of both a driver name and a driver badge number).

In 604, it is determined whether the trip embedding of the trip matches any trip embeddings within the existing network of albums. For example, it is determined whether the vector-based face embedding of a trip (i.e., the trip embedding) matches any vector-based face embeddings within the existing network of albums. This is done by running the GCN on the entire network and the query trip. The output weighted graph is then analyzed to determine if there are any matches with the existing albums. In some embodiments, matching a vector-based face embedding comprises determining a similarity (e.g., a cosine similarity) between two or more vector-based face embeddings above a threshold level of confidence (e.g., above a confidence level of 50%, 75%, 88%, 95%, 98%, or any appropriate threshold level of confidence).

In response to determining that the trip embedding of the trip does not match any trip embeddings within the existing network of albums, control passes to 612. In response to determining that the trip embedding of the trip matches any trip embeddings within the existing network of albums, the process flows to 606. For example, it is determined that the trip embedding of the trip matches one or more trip embeddings within the existing network of albums above a threshold level of confidence.

In 606, the driver ID from the trip embedding within the existing network of albums that best matches the trip embedding of the trip is determined. For example, two or more trip embeddings within the existing network of albums are found to match the trip embedding above a threshold level of confidence, and the driver ID from the trip embedding with the highest level of confidence is determined to be the best match. In some embodiments, wherein only one trip embedding is found to match above a threshold level of confidence, the driver ID from that trip is determined to be the best match. In various embodiments, wherein more than one trip embedding is found to match, each with a highest level of confidence, the first trip embedding on a list of highest levels of confidence is determined as the best match, the last trip embedding on a list of highest levels of confidence is determined as the best match, a random selection from a list of highest levels of confidence is determined as the best match, or any other appropriate method of determining the best match. In various embodiments, more than one best match is determined (e.g., 2, 3, 4 or any appropriate number of best matches are determined).

In 608, the driver ID is assigned to the trip. For example, a driver name and a driver badge number are assigned to the trip. In various embodiments, more than one driver ID is assigned to the trip (e.g., the top three best driver ID matches are assigned to the trip). In 610, the trip with the assigned driver ID is provided, and the process ends. For example, the trip with the assigned driver ID is provided to a software program operating within a driver identification system processor and/or database (e.g., a hard assignment buffer, a soft assignment buffer, a final status assignment, and/or an album within the network of albums), and the process ends. In some embodiments, where the trip is from a vehicle on a standby list, the trip with the assigned driver ID is provided (i.e., returned) to the standby list, and the process ends. In some embodiments, where the trip is from an unknown vehicle, the trip with the assigned driver ID is provided to the system user (e.g., to register the vehicle in the network, or for any appropriate purpose), and the process ends.

In 612, the trip is provided to the system user. For example, a trip that is missing a driver ID is provided to the system user. In 614, the system user is requested to provide the driver ID for the trip. For example, the system user is provided with one or more driver images (e.g., one or more face embeddings) and requested to provide the driver's name and driver's badge number for the trip.

In 616, the driver ID for the trip is received, and control passes to 608. For example, the driver ID for the trip is received from the system user by the driver identification system (e.g., via a communications network) or received by a system administrator for entering into the driver identification system database, and control passes to 608.

Figure 7:
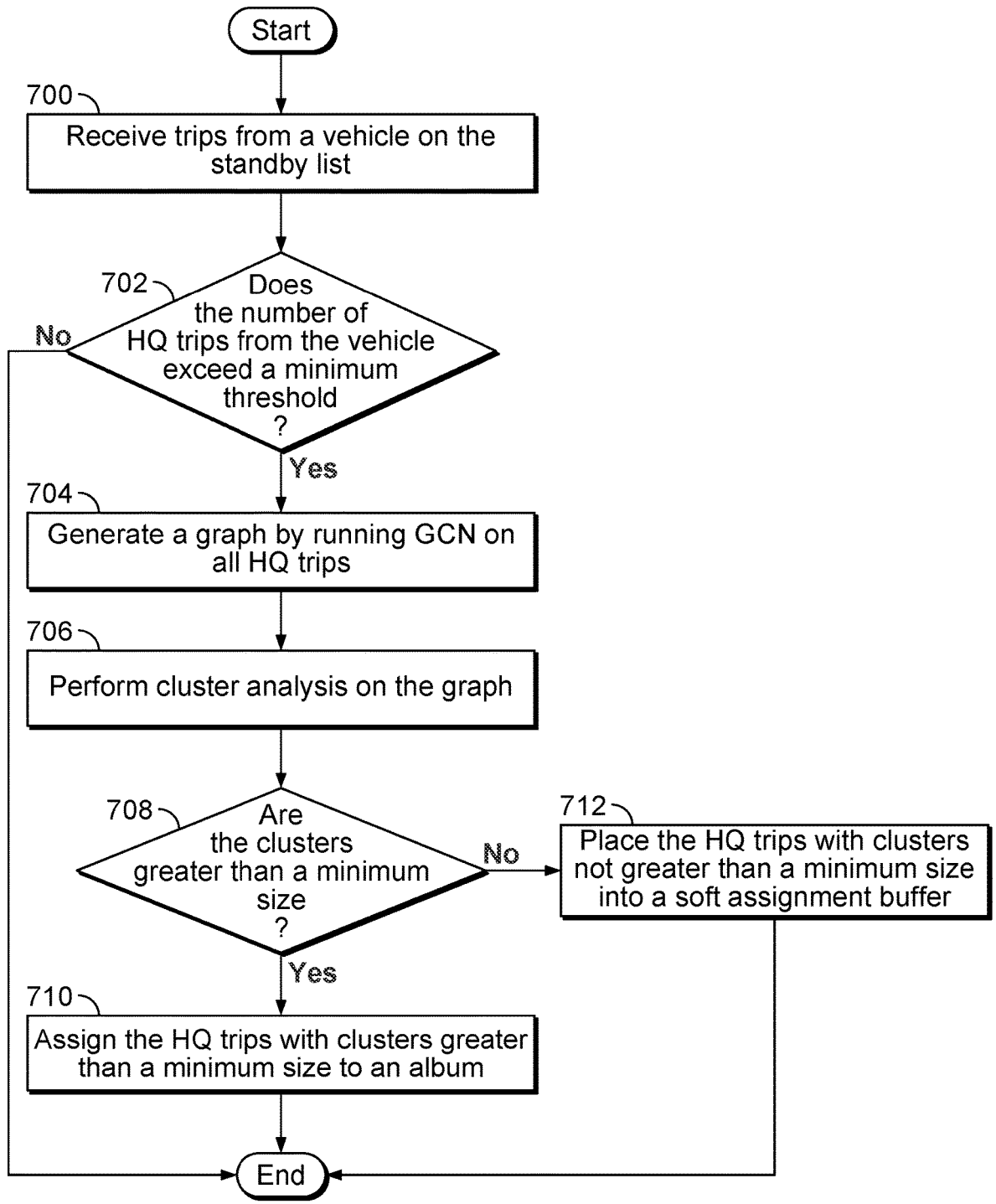
FIG. 7 is a flow diagram illustrating an embodiment of a process for initializing a network.

FIG. 7 is a flow diagram illustrating an embodiment of a process for initializing a network. In some embodiments, the process of FIG. 7 is executed by driver identification system 200 of FIG. 2. In the example shown, in 700, trips are received from a vehicle on the standby list. For example, trips associated with a vehicle on the standby list, each trip comprising a trip embedding, a start and end time, and a start and end location, are received from a standby list stored in a database of a driver identification system.

In 702, it is determined whether the number of HQ trips from the vehicle exceeds a minimum threshold. For example, it is determined by a software program operating within a driver identification system processor whether the number of HQ trips from the vehicle exceeds a minimum threshold (e.g., three, four, five, or any other appropriate number of HQ trips). In response to determining that the number of HQ trips from the vehicle does not exceed a minimum threshold, the process ends. In response to determining that the number of HQ trips from the vehicle exceeds a minimum threshold, the process flows to 704.

In some embodiments, the criteria for initialization are as follows: turn on face data collect for 3 days; during this time trips are created via face2trip but are not assigned; on day 4, check to see if more than 80% of the vehicles collecting faces have become qualified (e.g., as in 702) if this criteria is met, run initialization on all HQ trips from all qualified vehicles (e.g., as in 704); and unqualified vehicles trips are put in the vehicle standby list.

In 704, a graph is generated by running GCN on all HQ trips. For example, a weighted graph is generated by running a graph convolutional network (GCN) analysis on all HQ trips from the standby list, wherein the nodes of the weighted graph are trips and the node edges are similarity scores. In 706, cluster analysis is performed on the graph. For example, a clustering model of a driver identification system is used to generate clusters of self-similar trips from the weighted graph output of the GCN.

In 708, it is determined whether the clusters are greater than a minimum size. For example, it is determined whether the number of trips within each cluster is greater than a minimum size. In various embodiments, the minimum size is 3, 4, 5, 6, 7, or any appropriate minimum size. In response to determining that the clusters are not greater than a minimum size, control passes to 712. In response to determining that the clusters are greater than a minimum size, the process flows to 710.

In 710, the HQ trips with clusters greater than a minimum size are assigned to an album, and the process ends. For example, clusters of trips greater than a minimum size are assigned to albums to become the first albums to initialize the network, and the process ends. In 712, the HQ trips with clusters not greater than a minimum size are placed into a soft assignment buffer, and the process ends. For example, the HQ trips with clusters not greater than a minimum size are placed into a soft assignment buffer (e.g., a memory, a hard drive, or any other appropriate data storage) within a driver identification system database, and the process ends.

Figure 8A:
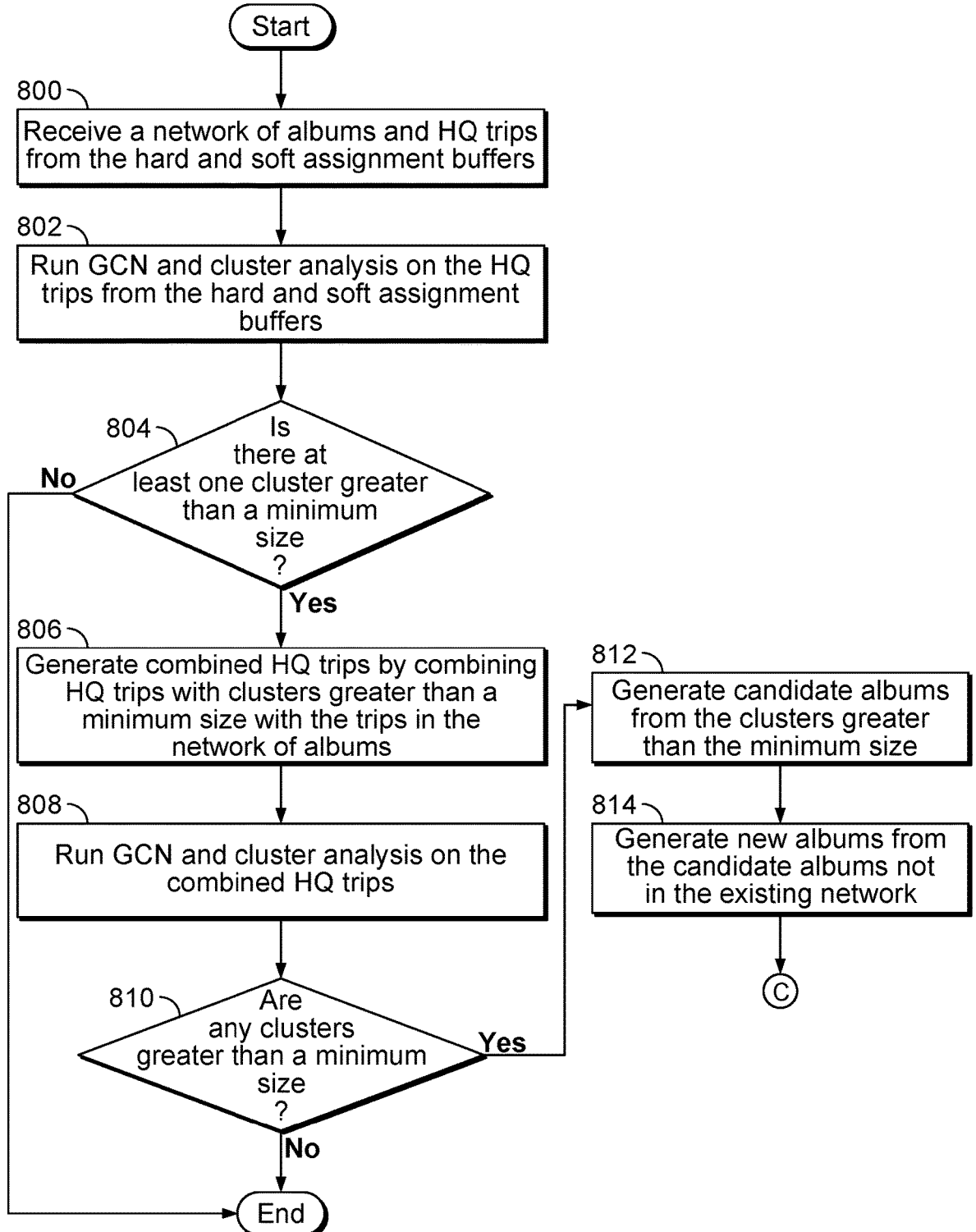
FIGS. 8A and 8B are a flow diagram illustrating an embodiment of a process for updating a network.
Figure 8B:
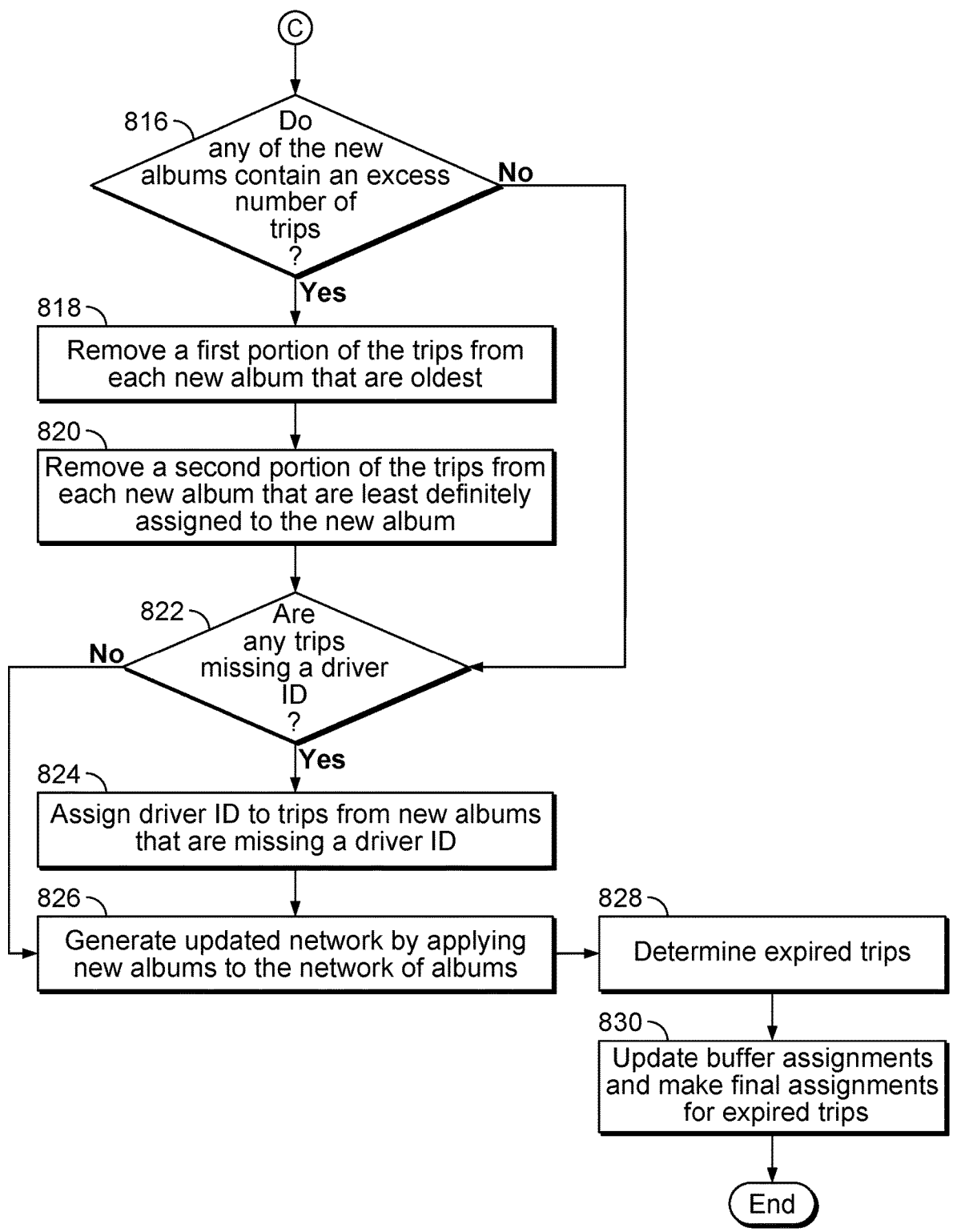

FIGS. 8A and 8B are a flow diagram illustrating an embodiment of a process for updating a network. In some embodiments, the process of FIGS. 8A and 8B is executed by driver identification system 200 of FIG. 2. In the example shown, in 800, a network of albums and HQ trips is received from the hard and soft assignment buffers. For example, a network of albums (e.g., a set of albums belonging to a system user comprising a fleet management organization) stored in a database of a driver identification system, and HQ trips stored in the hard and soft assignment buffers of a database of a driver identification system, are received by a driver identification system processor.

In 802, GCN and cluster analysis is run on the HQ trips from the hard and soft assignment buffers. For example, HQ trips from the hard and soft assignment buffers are analyzed for how well they relate to each other using a similarity metric (e.g., cosine similarity). HQ trips that share similarity metric values (e.g., a similarity 'score') within a threshold difference from each other are considered to 'self-cluster' with each other. In some embodiments, the threshold difference is a difference of less than 1%, 5%, 8%, 10%, or any appropriate threshold difference.

For example, GCN analysis is run on the HQ trips from the hard and soft assignment buffers to produce a weighted graph—for example, a weighted graph comprising nodes (or vertices) that represent the HQ trips, and weighted edges, wherein the weights of the edges represent the similarity between two nodes. In various embodiments, the HQ trips from the hard and soft assignment buffers are analyzed by one or more clustering algorithms (i.e., a clustering 'model') applied to the weighted graph output of the GCN. In some embodiments, determining the clustering is based at least in part on clustering analysis of an output of a graph convolutional network, or any other appropriate neural network or machine learning algorithm. In some embodiments, determining the clustering is based at least in part on N neighbors and M neighbors of the N neighbors, where N and M are integers.

In various embodiments, the one or more clustering algorithms uses shared nearest neighbor clustering (e.g., the Jarvis-Patrick algorithm), vertex betweenness clustering, edge betweenness clustering (e.g., the Girvan and Newman algorithm), highly connected subgraph clustering, maximal clique enumeration (e.g., the Bron and Kerbosch algorithm), kernel k-means clustering, or any appropriate clustering algorithm.

In 804, it is determined whether there is at least one cluster greater than a minimum size. For example, it is determined whether the clusters of HQ trips that self-cluster contain a number of HQ trips greater than a minimum size. In various embodiments, the minimum size is 3, 4, 5, 6, 7, or any appropriate minimum size. In response to determining that there is at least one cluster not greater than a minimum size, the process ends. In response to determining that there is at least one cluster greater than a minimum size, the process flows to 806.

In 806, combined HQ trips are generated by combining HQ trips with clusters greater than a minimum size with the trips in the network of albums. For example, combined HQ trips are generated by combining HQ trips that self-cluster greater than a minimum size with the trips in the received network of albums.

In 808, GCN and cluster analysis is run on the combined HQ trips. For example, GCN and cluster analysis is run on HQ trips that self-cluster greater than a minimum size and trips from the received network of albums. In some embodiments, GCN and cluster analysis is run on the combined HQ trips using the same GCN and clustering algorithms used to generate HQ trips that self-cluster greater than a minimum size. In various embodiments, GCN and/or cluster analysis is run on the combined HQ trips using different GCN and clustering algorithms used to generate HQ trips that self-cluster greater than a minimum size.

In 810, it is determined whether any clusters are greater than a minimum size. For example, it is determined whether one or more clusters are greater than a minimum size. In various embodiments, the minimum size is 3, 4, 5, 6, 7, or any appropriate minimum size.

In response to determining that any clusters are not greater than a minimum size, the process ends. In response to determining that any clusters are greater than a minimum size, the process flows to 812. In 812, candidate albums are generated from the clusters greater than the minimum size. For example, candidate albums comprising a collection of self-similar trips that represent a driver are generated from clusters of HQ trips greater than the minimum size. In some embodiments, a single driver may end up in more than one album. Albums are dynamic and change over time by adding updated trips and removing old trips. A network of albums is a dynamic collection of albums that represents the drivers of a system user at any given time.

In 814, new albums are generated from the candidate albums not in the existing network, and the process flows to 816 of FIG. 8B. For example, it is determined which candidate albums are not in the existing network of albums, and new albums are generated by hard-assigning trips in the candidate albums not in the existing network to new albums, and the process flows to 816 of FIG. 8B.

In some embodiments, just for clarity, the end result of 810 will be candidate albums. Some of these candidate albums will have trips from old albums, so they were already part of the network prior to the network update. In some embodiments, all candidate albums will go through the 816 process, not just brand new albums but also albums that contain old network trips.

In 816, it is determined whether any of the new albums contain an excess number of trips. For example, it is determined whether any of the new albums contain a number of trips in excess of a maximum allowable number of trips (e.g., do any of the candidate albums contain an excess number of trips?). In some embodiments, determining the updated trip assignments to the updated set of albums comprises determining whether the number of trips in the cluster associated with the specific album exceeds a maximum album size. In various embodiments, there is a maximum number of trips M allowed in an album (e.g., M is five, ten, twenty, thirty, thirty-five, forty, sixty-three, or any other appropriate number).

In response to determining that any of the new albums do not contain an excess number of trips, control passes to 822. In response to determining that any of the new albums contain an excess number of trips, the process flows to 818. For example, it is determined that there is E number of excess trips above M, inclusive of the candidate trips and the existing trips in the new album. In some embodiments, in response to the number of trips in the cluster associated with the specific album exceeding the maximum album size, a first set of trips associated with the specific album is removed, wherein the first set of trips comprises some trips exceeding the maximum album size that are oldest. In some embodiments, in response to the number of trips in the cluster associated with the specific album exceeding the maximum album size, a second set of trips associated with the specific album is removed, wherein the second set of trips comprises trips that are least definitely assigned to the specific album.

In 818, a first portion of the trips from each new album that are oldest are removed. For example, a first portion comprising a fraction of E of the oldest trips are removed (e.g., ¾, ⅔, ½, ⅓, ¼, or any other appropriate fraction are removed).

In 820, a second portion of the trips from each new album that are least definitely assigned to the new album are removed. For example, a second portion of trips from each new album that are least definitely assigned to the new album are removed to bring the total number of trips for the new album back to M. In some embodiments, determining which trips are least definitely assigned to an album comprises determining which trips are most similar to the nearest neighbor album (e.g., using cosine similarity as a metric).

In 822, it is determined whether any trips are missing a driver ID. For example, the trips in the new albums are reviewed by a software program operating within a driver identification system processor to determine whether any trips are missing a driver ID. In response to determining that any of the new albums do not contain an excess number of trips, control passes to 826. In response to determining that any trips are missing a driver ID, the process flows to 824.

In 824, a driver ID is assigned to trips from new albums that are missing a driver ID. For example, a driver ID determined by the process of FIG. 6 is assigned to each trip in the new albums that is missing a driver ID. In 826, an updated network is generated by applying new albums to the network of albums. For example, the new albums are added and stored (i.e., 'applied') to a database of an existing network of albums within a driver identification system. In some embodiments, determining the updated trip assignments to the updated set of albums comprises assigning each of the set of provisionally assigned trips to an existing album in the set of albums or a new album. In some embodiments, determining the updated trip assignments to the updated set of albums comprises determining from a second clustering a number of trips in a cluster associated with a specific album.

In some embodiments, in 826, all albums are replaced with the new candidate albums. In some cases, there may be new albums that do not contain any previous network trips—but the majority of the updates are old albums updated with new trips. Names associated with old albums are tracked to the new albums by tracking how the network trips migrate.

In 828, expired trips are determined. For example, trips that exceed a maximum time in the hard and soft assignment buffers of a driver identification system are determined to be expired—for example, 4 days, 5 days, 6 days, 1 week, or any other appropriate maximum time.

In 830, buffer assignments are updated and final assignments are made for expired trips, and the process ends. For example, at the end of a network update, trips in the hard and soft assignment buffers are combined with all the trips in the updated network of albums to be analyzed by GCN and cluster analysis. In some embodiments, buffer assignments are updated according to whether the trips in the buffers clustered or not above a minimum size. For example, trips that clustered above a minimum size are placed (or kept) in the hard assignment buffer, while trips that did not cluster above a minimum size are placed (or kept) in the soft assignment buffer. In some embodiments, the provisionally assigned trip (i.e., a trip assigned to the hard or soft assignment buffer) is indicated to have a final status in response to not being assigned to an existing album or a new album. In some embodiments, final hard or soft status assignments are made for buffered trips that have expired (i.e., exceeded the maximum number of allowed days to be in the buffer). In some embodiments, the final status comprises a confidence level. In some embodiments, the final status comprises an associated album or a driver identifier. Trips with final status assignments are stored in the database of the driver identification system, and the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for driver identification, comprising:
   an interface configured to:
      receive a trip; and
      receive a set of albums, wherein an album of the set of albums includes one or more existing trips;
   a processor configured to:
      determine similarities for the trip to all trips in the set of albums;
      determine a first clustering based at least in part on the similarities;
      indicate that the trip is a provisionally assigned trip that is provisionally assigned to the album of the set of albums based at least in part on the first clustering;
      determine a second clustering for a set of provisionally assigned trips and all trips in the set of albums, wherein the set of provisionally assigned trips comprises qualified provisionally assigned trips; and
      determine updated trip assignments for an updated set of albums.

2. The system of claim 1, wherein determining the first clustering is based at least in part on clustering analysis of an output of a graph convolutional network, or any other appropriate neural network or machine learning algorithm.

3. The system of claim 1, wherein determining the first clustering is based at least in part on N neighbors and M neighbors of the N neighbors.

4. The system of claim 1, wherein the trip comprises a trip embedding, a start time, an end time, a start location, an end location, a quality designation, and/or a vehicle identifier.

5. The system of claim 4, wherein the trip embedding comprises a representative face embedding.

6. The system of claim 5, wherein the representative face embedding comprises an average of a set of face embeddings from the trip.

7. The system of claim 6, wherein the set of face embeddings comprises face embeddings with a similarity rank to one or more average images above a threshold.

8. The system of claim 7, wherein the one or more average images comprise one or more of: an average face image, an average pose image, and an average torso image.

9. The system of claim 1, wherein determining the updated trip assignments to the updated set of albums comprises assigning each of the set of provisionally assigned trips to an existing album in the set of albums or a new album.

10. The system of claim 1, wherein determining the updated trip assignments to the updated set of albums comprises determining from the second clustering a number of trips in a cluster associated with a specific album.

11. The system of claim 10, wherein determining the updated trip assignments to the updated set of albums comprises determining whether the number of trips in the cluster associated with the specific album exceeds a maximum album size.

12. The system of claim 11, wherein in response to the number of trips in the cluster associated with the specific album exceeding the maximum album size, removing a first set of trips associated with the specific album, wherein the first set of trips comprises some trips exceeding the maximum album size that are oldest.

13. The system of claim 11, wherein in response to the number of trips in the cluster associated with the specific album exceeding the maximum album size, removing a second set of trips associated with the specific album, wherein the second set of trips comprises trips that are least definitely assigned to the specific album.

14. The system of claim 1, wherein the provisionally assigned trip is indicated to have a final status in response to not being assigned to an existing album or a new album.

15. The system of claim 14, wherein the final status comprises a confidence level.

16. The system of claim 14, wherein the final status comprises an associated album or a driver identifier.

17. The system of claim 1, wherein the qualified provisionally assigned trips are qualified by self-clustering.

18. The system of claim 1, wherein the qualified provisionally assigned trips are qualified by being high quality trips.

19. A method for driver identification, comprising:
   receiving a trip;
   receiving a set of albums, wherein an album of the set of albums includes one or more existing trips;
   determining, using a processor, similarities for the trip to all trips in the set of albums;
   determining a first clustering based at least in part on the similarities;
   indicating that the trip is a provisionally assigned trip that is provisionally assigned to the album of the set of albums based at least in part on the first clustering;
   determining a second clustering for a set of provisionally assigned trips and all trips in the set of albums, wherein the set of provisionally assigned trips comprises qualified provisionally assigned trips; and
   determining updated trip assignments for an updated set of albums.

20. A computer program product for driver identification, the computer program product being embodied in a non-transitory computer readable storage medium and comprising computer is instructions for:

receiving a trip;
receiving a set of albums, wherein an album of the set of albums includes one or more existing trips;
determining similarities for the trip to all trips in the set of albums;
determining a first clustering based at least in part on the similarities;
indicating that the trip is a provisionally assigned trip that is provisionally assigned to the album of the set of albums based at least in part on the first clustering;
determining a second clustering for a set of provisionally assigned trips and all trips in the set of albums, wherein the set of provisionally assigned trips comprises qualified provisionally assigned trips; and
determining updated trip assignments for an updated set of albums.

* * * * *